United States Patent
Jung et al.

(10) Patent No.: US 9,875,022 B2
(45) Date of Patent: *Jan. 23, 2018

(54) PORTABLE TERMINAL DEVICE USING TOUCH PEN AND HANDWRITING INPUT METHOD THEREOF

(71) Applicant: SAMSUNG ELECTRONICS CO., LTD., Suwon-si (KR)

(72) Inventors: Jong-woo Jung, Hwaseong-si (KR); In-sik Myung, Incheon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,054

(22) Filed: Oct. 4, 2016

(65) Prior Publication Data

US 2017/0024122 A1    Jan. 26, 2017

Related U.S. Application Data

(63) Continuation of application No. 14/254,964, filed on Apr. 17, 2014, now Pat. No. 9,489,126.

(30) Foreign Application Priority Data

May 7, 2013  (KR) .......................... 10-2013-0051335

(51) Int. Cl.
*G06K 9/00*    (2006.01)
*G06F 3/0488*    (2013.01)
(Continued)

(52) U.S. Cl.
CPC ........ *G06F 3/04883* (2013.01); *G06F 1/1613* (2013.01); *G06F 3/03545* (2013.01);
(Continued)

(58) Field of Classification Search
CPC .... G06F 17/242; G06F 3/04883; G06F 3/041; G06F 3/0488; G06F 3/03545;
(Continued)

(56) References Cited

U.S. PATENT DOCUMENTS 5,850,477 A * 12/1998 Takada ................ G06F 3/04883
382/186
2004/0196313 A1    10/2004 Wynn et al.
(Continued)

FOREIGN PATENT DOCUMENTS

JP       2010-10967 A      1/2010
JP         5028379 B2      6/2012
(Continued)

OTHER PUBLICATIONS

Bouteruche F et al., "Handwritten Gesture Recognition Driven by the Spatial Context of Strokes", Eights International Proceedings on Document Analysis and Recognition, IEEE, Aug. 31, 2005, pp. 1221-1225, XP 010878276.
(Continued)

*Primary Examiner* — Aklilu Woldemariam
(74) *Attorney, Agent, or Firm* — Sughrue Mion, PLLC

(57) ABSTRACT

A portable terminal device using a touch pen and a handwriting input method thereof are provided. The handwriting input method of the portable terminal device using a touch pen includes displaying an execution screen of an application on a touch screen in response to the application being executed, overlapping a handwriting input layer, which is configured for a handwriting input, with the execution screen, inputting a handwriting image on an area of the handwriting input layer using the touch pen, determining a data type for recognizing the input handwriting image in consideration of an attribute of the area corresponding to a position in which the handwriting image has been input on
(Continued)

the execution screen, and recognizing the input handwriting image as the determined data type, and applying a recognized result of the determined data type to the application.

19 Claims, 32 Drawing Sheets

(51) Int. Cl.
| | | |
|---|---|---|
| G06K 9/40 | (2006.01) | |
| G06F 17/24 | (2006.01) | |
| G06F 1/16 | (2006.01) | |
| G06F 3/0354 | (2013.01) | |
| G06F 3/0481 | (2013.01) | |
| G06F 3/0484 | (2013.01) | |
| G06F 17/22 | (2006.01) | |

(52) U.S. Cl.
CPC ...... *G06F 3/04817* (2013.01); *G06F 3/04845* (2013.01); *G06F 17/2247* (2013.01); *G06F 17/242* (2013.01); *G06F 17/243* (2013.01); *G06K 9/00* (2013.01); *G06K 9/00402* (2013.01); *G06K 9/40* (2013.01)

(58) Field of Classification Search
CPC .. G06F 3/03547; G06F 3/0416; G06F 3/0481; G06F 3/018; G06F 3/04886; G06F 17/30864; G06F 1/1613; G06F 3/04817; G06F 3/04845; G06F 17/2247; G06F 3/0483; G06F 17/243; G06F 2203/04808; G06F 3/03; G06F 3/048; H04M 2250/22; H04N 5/23219; G06K 9/00402; G06K 9/00416; G06K 9/6293; G06K 9/00409; G06K 9/00979; G06K 9/40; G09G 2310/04; G09G 2340/16; G09G 2360/18; G09G 3/2025; G09G 3/38
USPC ........ 345/173, 174, 156; 382/186, 187, 188, 382/229; 715/202, 708, 779
See application file for complete search history.

(56) References Cited

U.S. PATENT DOCUMENTS

| | | | |
|---|---|---|---|
| 2006/0071910 A1* | 4/2006 | Kim | G06F 3/04883 345/173 |
| 2009/0326954 A1 | 12/2009 | Kawai et al. | |
| 2010/0149206 A1* | 6/2010 | Shigehisa | G06F 3/04883 345/595 |
| 2010/0328298 A1* | 12/2010 | Nakanishi | G09G 3/38 345/212 |
| 2011/0271185 A1 | 11/2011 | Chen et al. | |
| 2011/0279379 A1* | 11/2011 | Morwing | G06F 3/0237 345/173 |
| 2012/0302167 A1* | 11/2012 | Yun | G06F 3/04883 455/41.2 |
| 2013/0050141 A1* | 2/2013 | Park | G06F 3/0488 345/174 |
| 2013/0159916 A1* | 6/2013 | Wadayama | G06F 3/0488 715/776 |
| 2014/0019855 A1* | 1/2014 | Kim | G06F 3/04883 715/268 |
| 2014/0019905 A1* | 1/2014 | Kim | G06F 3/0481 715/780 |
| 2014/0075302 A1* | 3/2014 | Akashi | G06K 9/222 715/268 |
| 2014/0205158 A1* | 7/2014 | Fukazawa | G06K 9/00288 382/118 |
| 2014/0304586 A1* | 10/2014 | Hirabayashi | G06F 17/2247 715/234 |
| 2014/0334732 A1* | 11/2014 | Jung | G06F 3/04883 382/188 |

FOREIGN PATENT DOCUMENTS

| | | |
|---|---|---|
| KR | 20010070852 A | 7/2001 |
| KR | 10-0603809 B1 | 7/2006 |
| KR | 10-0874044 B1 | 12/2008 |
| WO | 0072131 A1 | 11/2000 |
| WO | 2008/105574 A1 | 9/2008 |

OTHER PUBLICATIONS

Communication dated Dec. 10, 2014, issued by the European Patent Office in counterpart European Application No. 14167297.2.

* cited by examiner

FIG. 7A

FIG. 7C
771
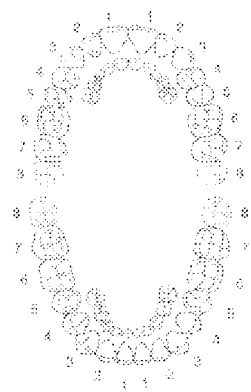
772
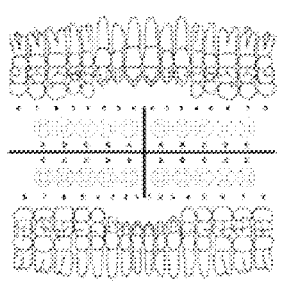
773
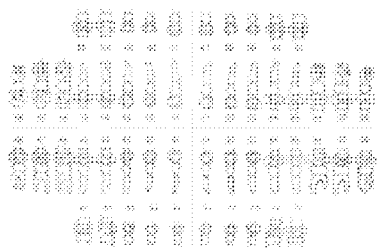

FIG. 14B
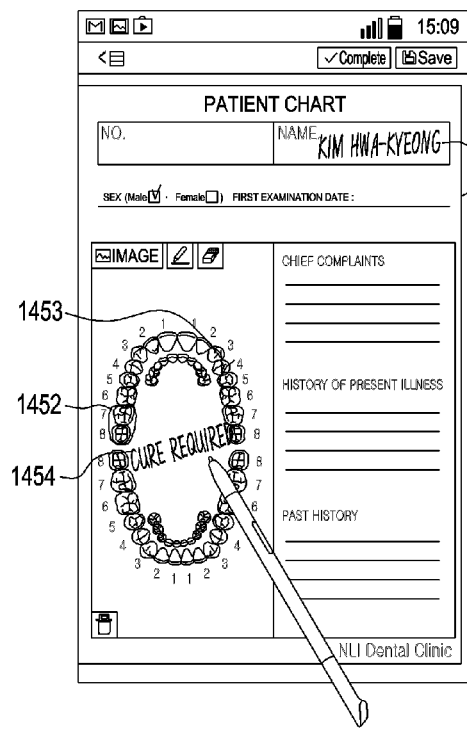
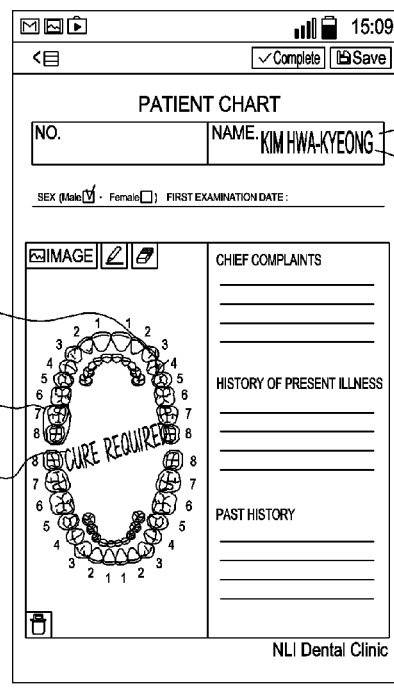

FIG. 16A
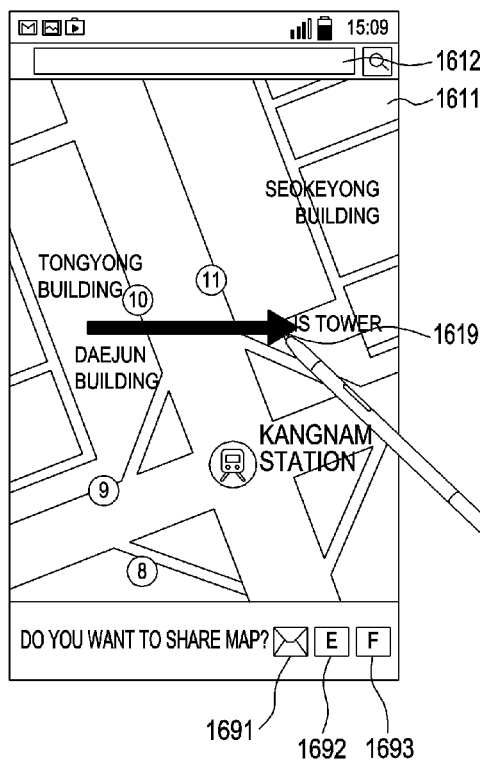
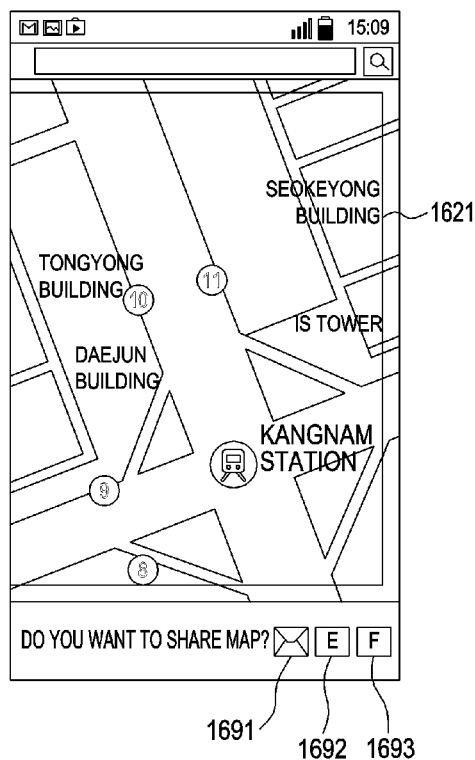

FIG. 16C
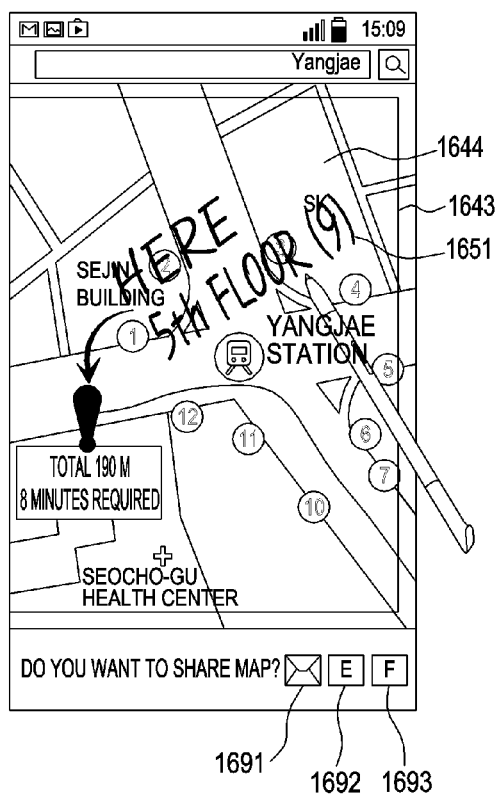
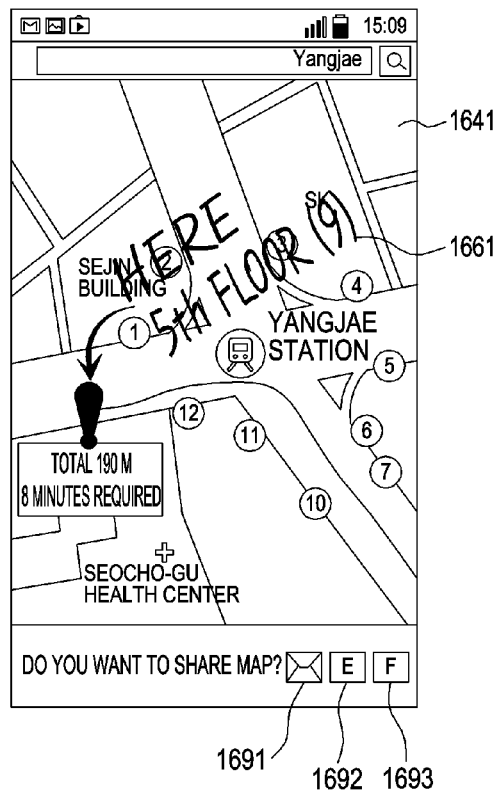

FIG. 17B
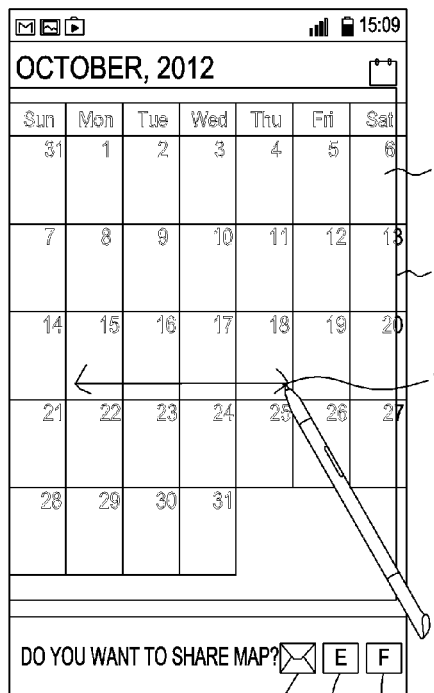
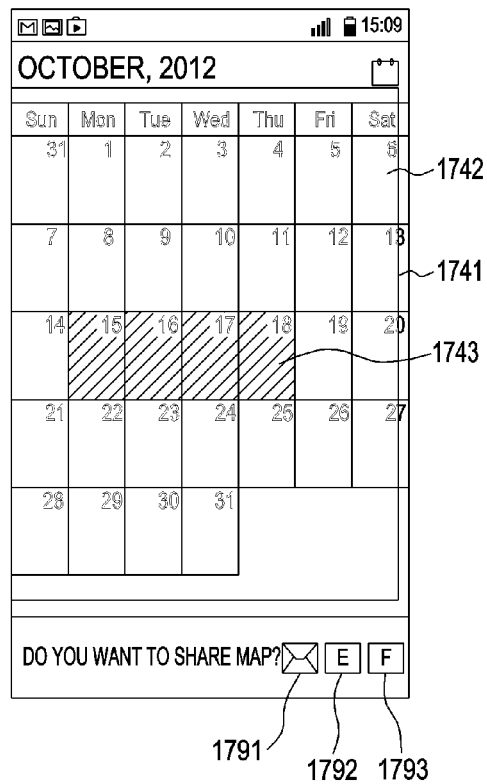

FIG. 17C
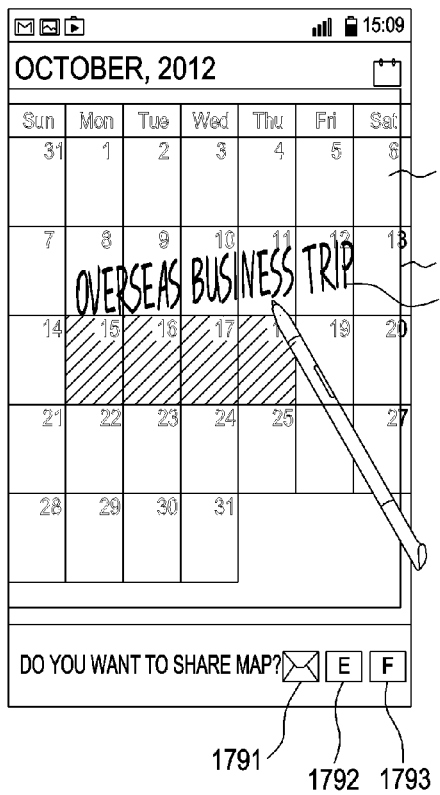
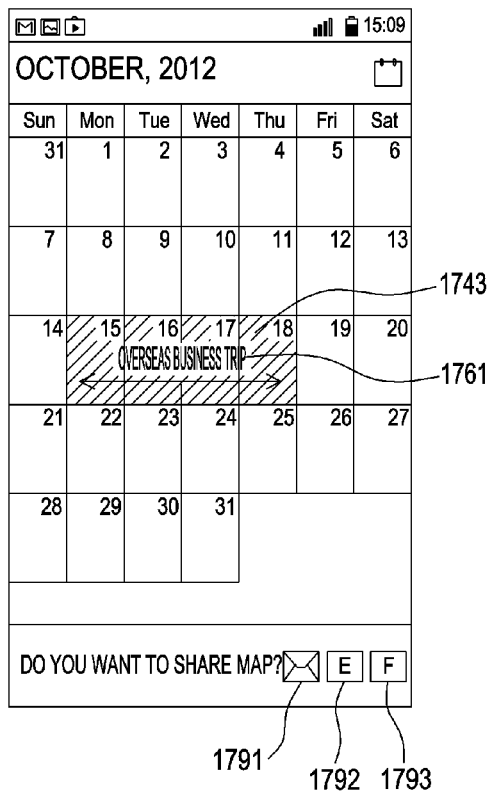

FIG. 18B
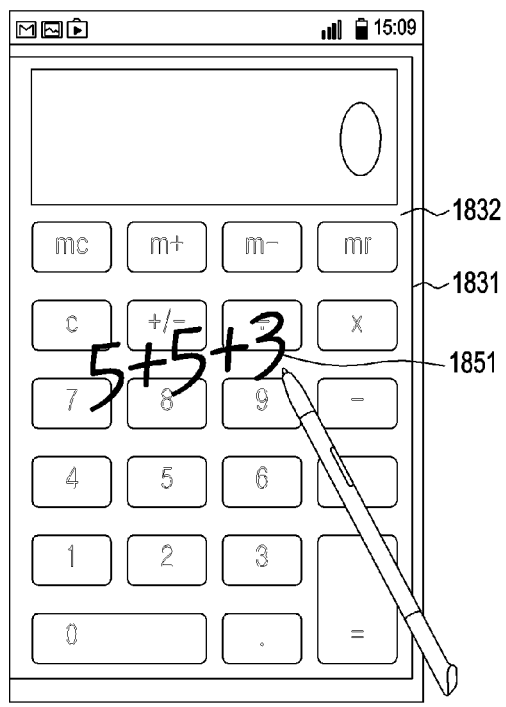
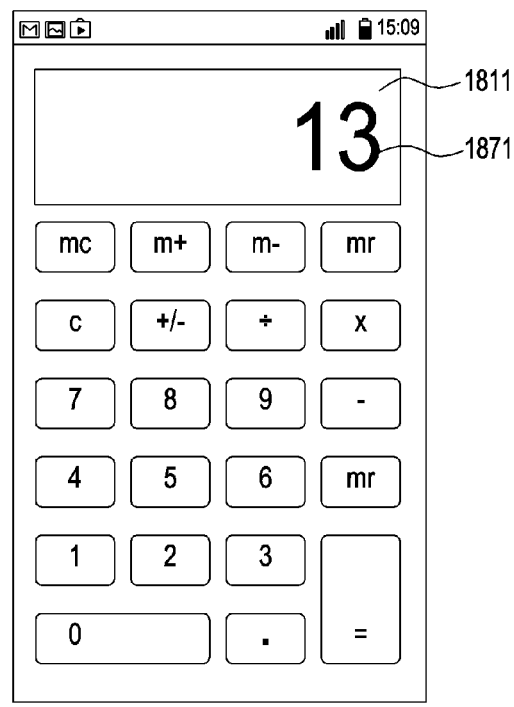

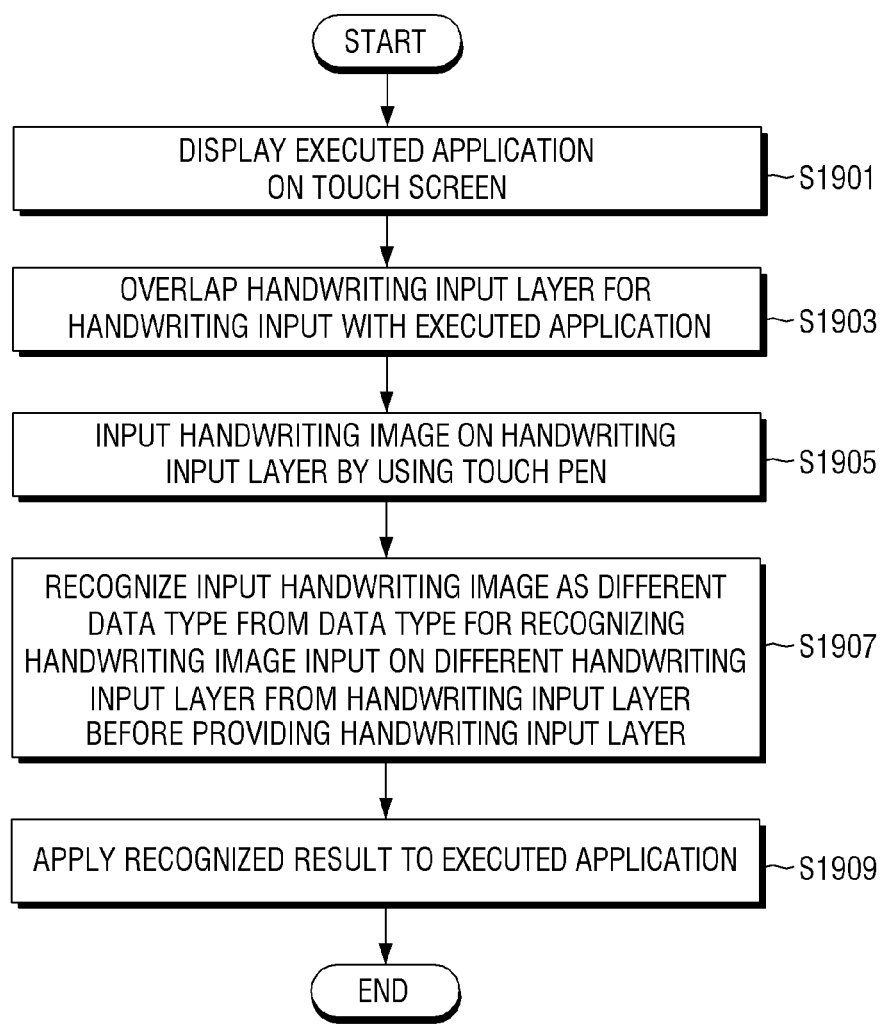

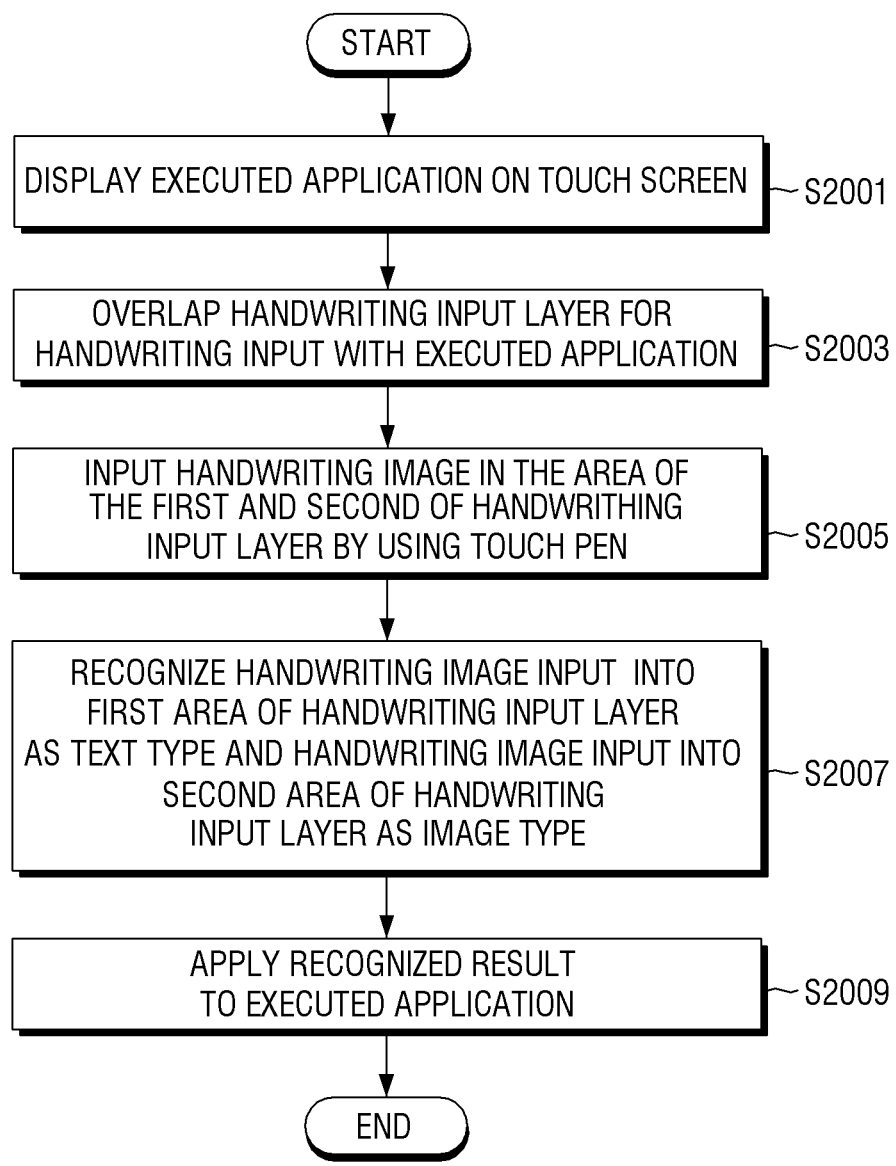

FIG. 21A
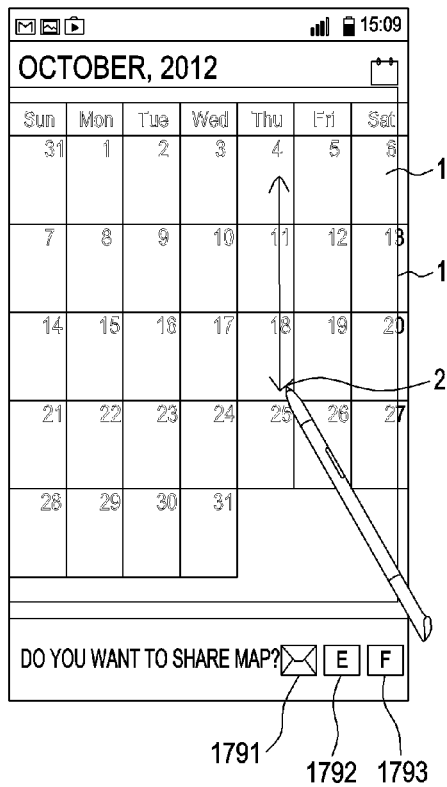
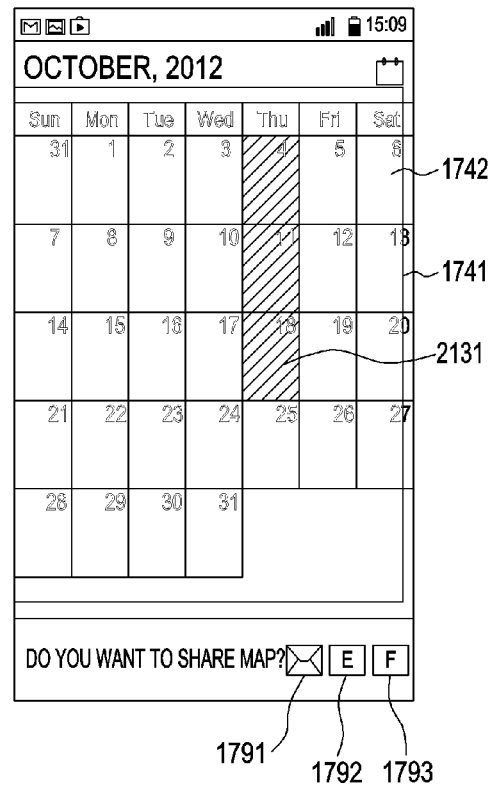

FIG. 21B
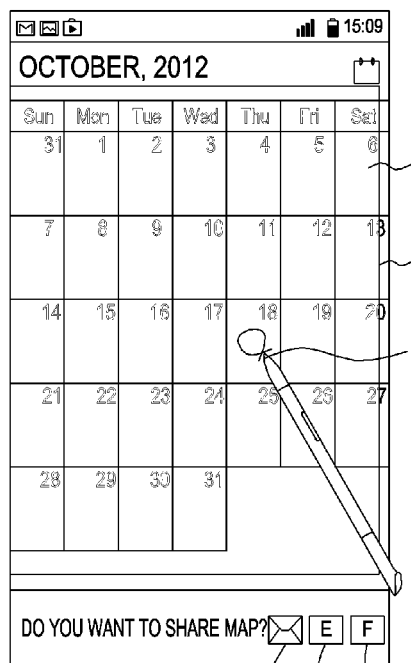
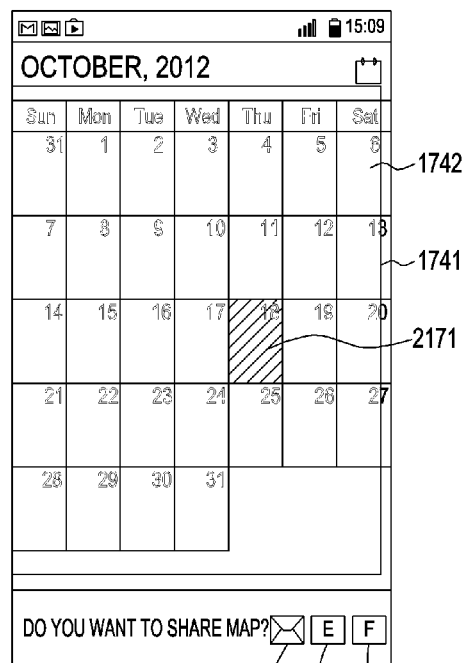

PORTABLE TERMINAL DEVICE USING TOUCH PEN AND HANDWRITING INPUT METHOD THEREOF

CROSS-REFERENCE TO RELATED APPLICATION(S)

This is a Continuation application of U.S. application Ser. No. 14/254,964, which was filed on Apr. 17, 2014, which claims priority from Korean Patent Application No. 10-2013-0051335, filed on May 7, 2013, in the Korean Intellectual Property Office, the disclosure of which is incorporated herein by reference in its entirety.

BACKGROUND

1. Field

Exemplary embodiments relate to providing a portable terminal device using a touch pen and a handwriting input method thereof. In particular, exemplary embodiments relate to providing a method of performing a handwriting input with respect to an application that is driven in a portable terminal device.

2. Description of the Related Art

As portable terminal devices increase, the needs of users for intuitive input/output methods have also increased. However, in view of portability, sizes of the portable terminal devices are limited. Thus, sizes of displays that display information in the portable terminal devices are smaller than general TVs, monitors, etc. Therefore, for inputs of various users, the portable terminal devices have evolved from related art user interface (UI) methods, for example, methods using additional elements such as keypads, mouse, etc., into intuitive UI methods that directly touch screens using fingers or touch pens or input information using voices. In particular, a user may minutely touch a screen using a touch pen, and a related art touch pen simply touches a particular area output on a display. Therefore, there are various needs for user methods to touch a portable terminal device, or to input data in the portable terminal device.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a method and an apparatus for inputting information using a handwriting-based user interface (UI) in a portable terminal device.

The exemplary embodiments also provide a method and an apparatus for inputting information into an application using a handwriting-based (UI) when the application is executed in a portable terminal device.

The exemplary embodiments also provide a method and an apparatus for inputting information into an application using a handwriting-based UI with a touch pen in a handwriting input layer overlapping with the application executed in a portable terminal device.

According to an aspect of the exemplary embodiments, there is provided a handwriting input method of a portable terminal device using a touch pen. The handwriting input method may include: displaying an execution screen of an application on a touch screen in response to the application being executed; overlapping a handwriting input layer, which is configured for a handwriting input, with the execution screen; inputting a handwriting image on an area of the handwriting input layer using the touch pen; determining a data type for recognizing the input handwriting image in consideration of an attribute of the area corresponding to a position in which the handwriting image has been input on the execution screen, and recognizing the input handwriting image as the determined data type; and applying a recognized result of the determined data type to the application.

The determining the data type for recognizing the input handwriting image may include: determining the data type for recognizing the input handwriting image in consideration of the attribute of the area of the execution screen overlapping with the area, into which the handwriting input image has been input, under the handwriting input layer, and recognizing the input handwriting image as the determined data type.

The application may be an application that displays a web screen provided by a server which is positioned outside the portable terminal device. The determining the data type for recognizing the input handwriting image may include: determining the data type input in a component of a hypertext markup language (HTML) document in an area of the web screen as the data type for recognizing the input handwriting image, and recognizing the input handwriting image as the determined data type.

In response to the execution screen including a text input field, the determining the data type for recognizing the input handwriting image may include: recognizing the input handwriting image as a text which is input in the text input field, and the applying the recognized result of the determined data type to the application may include: displaying the recognized text in the text input field.

In response to the area corresponding to the position in which the handwriting image has been input including a number input field, the determining the data type for recognizing the input handwriting image may include: recognizing the input handwriting image as at least one of a number or a numerical formula, and the applying the recognized result of the determined data type to the application may include: displaying a result calculated according to the recognized at least one number or the numerical formula in the number input field.

The determining the data type for recognizing the input handwriting image may be recognizing the input handwriting image as a text. The applying the recognized result of the determined data type to the application may include: using the recognized text as a search word to display at least one of an electronic document and a map image which includes the search word.

In response to the area corresponding to the position in which the handwriting image has been input including a table including a plurality of cells, the determining the data type for recognizing the input handwriting image may include: recognizing the handwriting image as a command which selects at least one of the plurality of cells, and the applying the recognized result of the determined data type to the application may include: in response to a handwriting image being additionally input on the handwriting input layer using the touch pen, recognizing the additionally input handwriting image as a text or an image to display the text or the image on at least one of the selected cells.

The overlapping of the handwriting input layer for the handwriting input with the application may include: responding to a touch drag gesture performed from a side of the touch screen toward a center of the touch screen to overlap the handwriting input layer for the handwriting input with the application.

The determining the data type to register the input handwriting image may include: recognizing the handwriting image as a plurality of respective data types; and storing a plurality of results recognized as the plurality of respective data types.

According to another aspect of the exemplary embodiments, there is provided a handwriting input method of a portable terminal device using a touch pen. The handwriting input method may include: displaying an execution screen of an application on a touch screen in response to the application being executed; overlapping a handwriting input layer, which is configured for a handwriting input, with the execution screen; inputting a plurality of handwriting images on a first area and a second area of the handwriting input layer, respectively, using the touch pen; recognizing the input handwriting image on the first area of the handwriting input layer as a text type and the input handwriting image on the second area of the handwriting input layer as an image type in consideration of a plurality of attributes of the first area and the second area of the execution screen, respectively, corresponding to the first area and the second area of the handwriting input layer; and applying a recognized result of the handwriting images to the application.

According to another aspect of the exemplary embodiments, there is provided a handwriting input method of a portable terminal device using a touch pen. The handwriting input method may include: displaying an execution screen of an application on a touch screen in response to the application being executed; overlapping a handwriting input layer, which is configured for a handwriting input, with the execution screen; inputting a handwriting image on the handwriting input layer using the touch pen; recognizing the input handwriting image as a different data type from a data type for recognizing a handwriting image input on a different handwriting input layer, before providing the handwriting input layer; and applying a recognized result of the different data type to the application. The different handwriting input layer is different from the handwriting input layer.

According to another aspect of the exemplary embodiments, there is provided a portable terminal device using a touch pen. The portable terminal device may include: a touch screen configured to display an execution screen of an application in response to the application being executed; and a controller configured to determine a data type for recognizing an input handwriting image in consideration of an attribute of an area of the execution screen corresponding to an area of a handwriting input layer in response to a handwriting image being input on the area of the handwriting input layer for a handwriting input using a touch pen, recognize the handwriting image as the determined data type, and apply a recognized result of the determined data type to the executed application. The handwriting input layer overlaps with the application.

The controller may be further configured to determine the data type for recognizing the input handwriting image in consideration of the attribute of the area of the execution screen overlapping with the area under the handwriting input layer, and recognize the input handwriting image as the determined data type.

The application may be an application that displays a web screen provided by a server which is positioned outside the portable terminal device. The controller may be further configured to determine the data type input in a component of a hypertext markup language (HTML) document in an area of the web screen as the data type for recognizing the input handwriting image, and recognize the input handwriting image as the determined data type.

In response to the area of the execution screen includes a text input field, the controller may be further configured to recognize the handwriting image as a text which is input in the text input field and display the recognized text in the text input field.

In response to the area of the execution screen including a number input field, the controller may be further configured to recognize the input handwriting image as at least one of a number or a numerical formula and display a result calculated according to the recognized at least one number or the numerical formula in the number input field.

The controller may be further configured to recognize the input handwriting image as a text and use the recognized text as a search word to display at least one of an electronic document and a map image which includes the search word.

In response to the area of the execution screen including a table including a plurality of cells, the controller may be further configured to recognize the handwriting image as a command which selects at least one of the plurality of cells and, in response to a handwriting image being additionally input on the handwriting input layer using the touch pen, the controller is further configured to recognize the additionally input handwriting image as a text or an image to display the text or the image on at least one of the selected cells.

If a handwriting input layer for a handwriting input overlaps with the application, the controller may respond to a touch drag gesture performed from a side of the touch screen toward a center of the touch screen to overlap the handwriting input layer of the handwriting input with the application.

The controller may be further configured to recognize the handwriting image as a plurality of respective data types and store a plurality of results recognized as the plurality of data types.

According to another aspect of the exemplary embodiments, there is provided a portable terminal device using a touch pen. The portable terminal device may include: a touch screen configured to display an execution screen of the application in response to an application being executed; and a controller configured to input a plurality of handwriting images into a first area and a second area, respectively, of a handwriting input layer which overlaps with the execution screen using the touch pen, recognize the handwriting image input in the first area of the handwriting input layer as a text type and the handwriting image input in the second area of the handwriting input layer as an image type in consideration of a plurality of attributes of the first area and the second area, respectively, of the execution screen corresponding to the first area and the second area of the handwriting input layer, and apply a recognized result of the handwriting images to the executed application.

According to another aspect of the exemplary embodiments, there is provided a portable terminal device using a touch pen. The portable terminal device may include: a touch screen configured to display an execution screen of an application in response to the application being executed; and a controller configured to recognize an input handwriting image as a different data type from a data type for recognizing a handwriting image input on a different handwriting input layer, before providing a handwriting input layer in response to a handwriting image being input on the handwriting input layer which overlaps with the execution screen using the touch pen, and apply a recognized result of the different data types to the executed application. The different handwriting input layer is different from the handwriting input layer.

According to another aspect of the exemplary embodiments, there is provided a handwriting input method of a portable terminal device. The method may include: displaying an application on a touch screen in response to the application being executed; displaying an input field provided by the application; determining whether a touch input has been performed using a finger or a touch pen; acquiring a text based on the determined touch input; and displaying the acquired text in the input filed based on the determined touch.

BRIEF DESCRIPTION OF THE DRAWINGS

The above and/or other aspects will be more apparent by describing certain exemplary embodiments with reference to the accompanying drawings, in which:

FIGS. 7A and 7B are views illustrating a scenario that displays a text in an input field of a hospital chart application in a portable terminal device, according to an exemplary embodiment;

FIG. 7C is a view illustrating images that may be displayed in an image area of a hospital chart application in a portable terminal device, according to an exemplary embodiment;

FIGS. 14A and 14B are views illustrating a scenario that displays a text or an image in a hospital chart application in a portable terminal device, according to an exemplary embodiment;

FIGS. 16A through 16C are views illustrating a scenario that applies a recognition result of a handwriting image to a search application in a portable terminal device, according to an exemplary embodiment;

FIGS. 17A through 17C are views illustrating a scenario that applies a recognition result of a handwriting image to a schedule management application in a portable terminal device, according to an exemplary embodiment;

FIGS. 18A and 18B are views illustrating a scenario that applies a recognition result of a handwriting image to a calculator application in a portable terminal device, according to an exemplary embodiment;

FIG. 19 is a flowchart illustrating a handwriting input method of a portable terminal device according to another exemplary embodiment;

FIG. 20 is a flowchart illustrating a handwriting input method of a portable terminal device according to another exemplary embodiment; and FIGS. 21A and 21B are views illustrating a scenario that applies a result of selecting at least one cell in a schedule management application according to an exemplary embodiment.

DETAILED DESCRIPTION OF THE EXEMPLARY EMBODIMENTS

Figure 1:
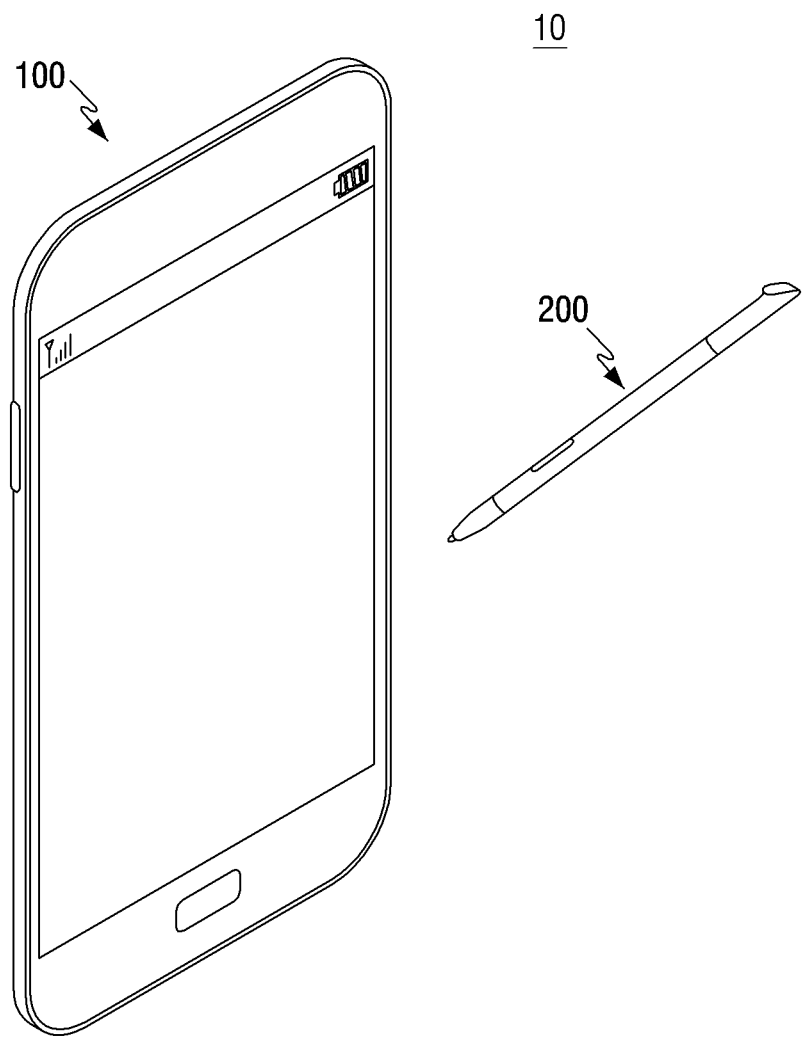
FIG. 1 is a view illustrating a handwriting input system according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating a handwriting input system 10 according to an exemplary embodiment.

Referring to FIG. 1, the handwriting input system 10 includes a portable terminal device 100 and a touch pen 200. In the handwriting input system 10, a user may grab the touch pen 200 to input a handwriting image on a screen of the portable terminal device 100. The handwriting input system 10 includes elements according to an exemplary embodiment, but may include further elements performing other functions.

Figure 2:
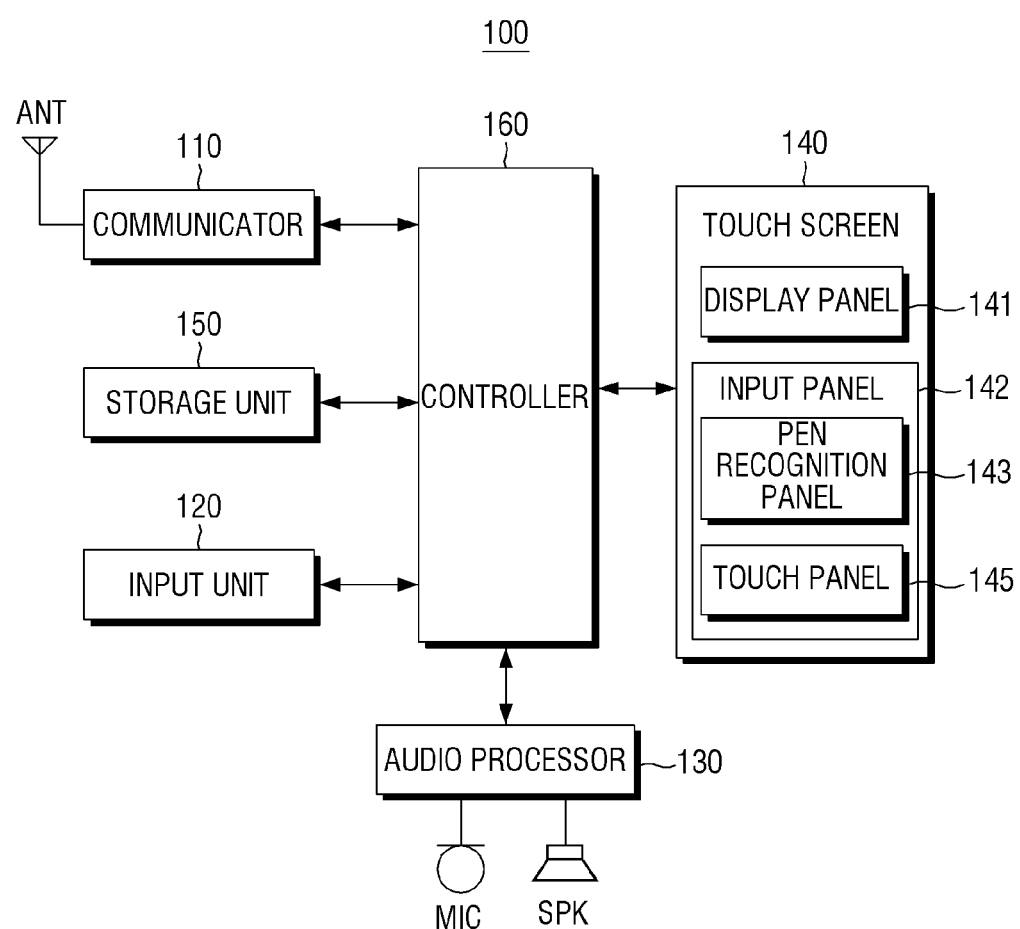
FIG. 2 is a block diagram illustrating a structure of a portable terminal device according to an exemplary embodiment.

FIG. 2 is a block diagram illustrating a structure of the portable terminal device 100, according to an exemplary embodiment. Referring to FIG. 2, the portable terminal device 100 according to the present exemplary embodiment includes a communicator 110, an input unit 120, an audio processor 130, a touch screen 140, a storage unit 150, and a controller 160.

The touch screen 140 includes a display panel 141 that performs a display function with respect to output information output in the portable terminal 100 and an input panel 142 that performs various types of input functions by the user. The input panel 142 may include at least one or more panels that may sense various types of inputs such as a single or multi touch input of the user using various types of objects, such as a finger, a pen, a drag input, a handwriting input, a drawing input, etc. For example, the input panel 142 may use one panel that may sense a finger input and a pen input or may be realized using two panels, i.e., a touch panel 145 that may sense a finger input and a pen recognition panel 143 that may sense a pen input.

In the present exemplary embodiment, the input panel 142 will be described as including two panels, i.e., the touch panel 145 that may sense the finger input and the pen recognition panel 143 that may sense the pen input.

The display panel 141 may be a panel such as a liquid crystal display (LCD), an active matrix organic light-emitting diode (AMOLED), etc. The display panel 141 may display various types of screens according to various operation states of the portable terminal device 100, an application execution, a service, etc. In particular, the display panel 141 according to the present exemplary embodiment may display an execution screen of an application including an input field. Alternatively, the display panel 141 may display a web application that is provided from a server (not shown) positioned outside the portable terminal device 100.

The touch panel 145 may sense a touch input of the user. For example, the touch panel 145 may have a touch film shape, a touch sheet shape, a touch pad shape, etc. The touch panel 145 senses a touch input and outputs a touch event value corresponding to a sensed touch signal. Information corresponding to the sensed touch signal may be displayed on the display panel 141. The touch panel 145 may receive a control signal through a touch input of the user using various types of input units. For example, the touch panel 145 may sense a touch input performed by using a body (for example, a finger) of the user, a physical tool, etc. According to an exemplary embodiment, the touch panel 145 may be realized as a capacitive type touch panel. If the touch panel 145 is realized as the capacitive type touch pane, a metal conductive material (for example, an Indium Tin Oxide (ITO) layer, etc.) is coated on both surfaces of glass to force a current to flow on the surfaces of the glass, and then a dielectric capable of storing charges is coated on the both surfaces of the glass to form the touch panel 145. If a surface of the touch panel 145 is touched by an object, a predetermined amount of charge moves to a contact position due to static electricity, and the touch panel 145 recognizes changes of a current caused by the movement of the charge to sense a touched position, and track a touch event. A touch event occurring on the touch panel 145 may be generated by a finger of the user or by another object that may change capacitance, for example, by a conductive material that may change capacitance.

The pen recognition panel 143 senses a pen proximity input or a pen touch input performed by an operation of the touch pen 200 (for example, a stylus pen, a digitizer pen, etc.) and outputs a sensed pen proximity event or a sensed pen touch event. The pen recognition panel 143 may be realized as an electron magnetic resonance (EMR) type and may sense a touch or proximity input according to changes of an intensity of an electromagnetic field that is caused by a proximity or touch of a pen. Further, the pen recognition panel 143 may include an electromagnetic induction coil sensor (not shown) in which a plurality of loop coils are respectively arranged in a preset first direction and a second direction intersecting with the preset first direction to have a grid structure and an electronic signal processor (not shown) that sequentially provides an alternating current (AC) signal having a predetermined frequency to the loop coils of the electromagnetic induction coil sensor.

If a pen including a resonance circuit exists around a loop coil of the pen recognition panel 143, a magnetic field transmitted from the corresponding loop coil generates a current based on a mutual electromagnetic induction in the resonance circuit of the pen. An induced magnetic field may be generated from coils constituting the resonance circuit of the pen based on the current, and the pen recognition panel 143 may detect the induced magnetic field from a loop coil that is in a signal receiving state to sense a proximity position or a touch position of the pen.

The pen recognition panel 143 may sense a proximity or a touch of an object that may generate a current based on an electromagnetic induction. In the present exemplary embodiment, the pen recognition panel 143 is used for recognizing only a pen proximity or a pen touch.

The pen recognition panel 143 may be disposed in a predetermined position of the portable terminal device 100 to be activated due to an occurrence of a particular event or by default. The pen recognition panel 143 may be formed under the display panel 141 to have a predetermined area, for example, an area that may cover a display area of the display panel 141.

The communicator 110 may be included if the portable terminal device 100 supports a communication function. In particular, if the portable terminal device 100 supports a mobile communication function, the communicator 110 may be constituted as a mobile communication module. The communicator 110 may perform a particular function of the portable terminal device 100, for example, a chatting function, a message transmitting and receiving function, a call function, etc.

The input unit 120 may be realized as a side key, additional touch pad, etc. The input unit 120 may also include a button key for turning on or off the portable terminal device 100, a home key for supporting a return to a basic screen supported by the portable terminal device 100, etc.

The audio processor 130 may include at least one of a speaker for outputting an audio signal of the portable terminal device 100 and a microphone for collecting the audio signal. The audio processor 130 may also control a vibration module to control a vibration size adjustment of the vibration module. For example, the audio processor 130 may differently adjust a vibration size according to a gesture input operation. In other words, if different types of gesture recognition information are input, the audio processor 130 may control the vibration module to have vibration sizes corresponding to the different types of gesture recognition information.

The storage unit 150 stores various types of programs and data necessary for operating the portable terminal device 100. For example, the storage unit 150 may store an operating system (OS) necessary for operating the portable terminal device 100 and functional programs for supporting a screen output on the display panel 141 described above.

The controller 160 may include various types of structures for receiving and displaying a handwriting image using a touch pen according to an exemplary embodiment and control signal processing, data processing, and function operating for inputting a handwriting based on these structures. For example, the controller 150 may provide a handwriting input layer that may overlap with an execution screen of an executed application to input handwriting and determine a data type in which a handwriting image input into an area of the handwriting input layer is recognized, in consideration of an attribute of an area of an execution screen corresponding to the area of the handwriting input layer. The controller 160 may recognize the determined data type as a handwriting image, and apply a recognized result to the executed application. For this purpose, the controller 160 may include elements as shown in FIG. 3.

Figure 3:
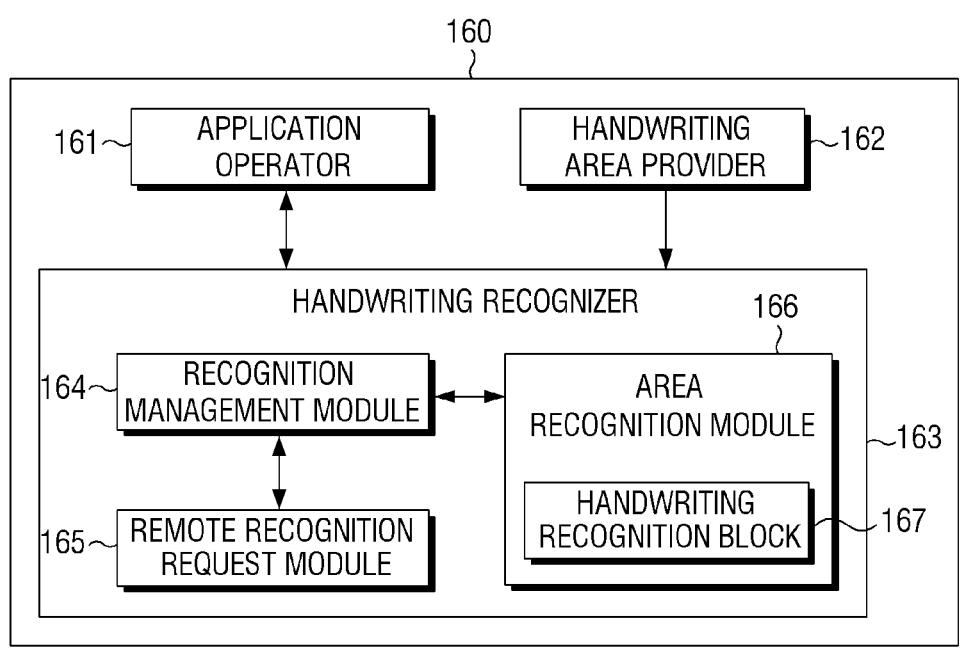
FIG. 3 is a block diagram illustrating a detailed structure of a controller of FIG. 2, according to an exemplary embodiment.

FIG. 3 is a block diagram illustrating a detailed structure of the controller 160, according to an exemplary embodiment.

Referring to FIG. 3, the controller 160 includes an application operator 161, a handwriting area provider 162, and a handwriting recognizer 163.

The application operator 161 may execute a user command or a particular application when driving a power source (for example, select an icon corresponding to the particular application on a wallpaper). The application operator 161 may operate the display panel 141 to display an execution screen of the executed application.

The handwriting area provider 162 may provide a handwriting input layer for recognizing a handwriting image input using a touch pen. For example, the handwriting area provider 162 may overlap the handwriting input layer with an input field provided on the execution screen of the displayed application. If the execution screen of the application includes a plurality of input fields, the handwriting area provider 162 may provide a plurality of handwriting input layers respectively corresponding to the plurality of input fields. The user may perform handwriting on the handwriting input layer using the touch pen.

A method of overlapping a handwriting input layer with an input field in an Android build system will now be described.

A layout that determines positions of an input field and a handwriting input layer on a screen may be programmed using an extensible mark-up language (XML) code as follows:

```
<FrameLayout
        android:id="@ +id/nli_title_layout"
        .........
        >
        .........
    <TextView
        android:id="@ +id/title"
        style="@ style/TextAppearance.EditEvent_Value"
        .........
        android:minHeight="48dip"
        androidingleLine="true" />
    .........
    <com.samsung.nli.util.view.NliSCanvasView
        android:id="@ +id/nli_title_nliSCanvasView"
        .........
        android:focusable="true" />
```

Referring to the above program, a developer calls method "TextView" to define a layout of the input field. If the input field is a title in the method "TextView", an attribute of a position or size related to the title may be defined. Also, the developer may call the method "nli_title_nliSCanvasView" to define an attribute of a position or a size of a handwriting input layer for inputting a handwriting image. Since the method "nli_title_nliSCanvasView" shares the same parent with the method "TextView", attributes of the position and the size of the handwriting input layer may be the same.

Method "NliScanvasView" may include method "nli_title_eraseImageButton" related to a delete button for deleting a portion of handwriting input into the handwriting input layer.

A layout that is defined from a Java code to an XML code may be programmed, called, and used:

```
mTitleTextView = (TextView) view.findViewById(R.id.title);
titleLayout = (FrameLayout) view.findViewById(R.id.nli_
```

```
title_layout);
    titleSCanvasView = (NliSCanvasView)
view.findViewById(R.id.nli_title_nliSCanvasView);
    titleEraseImageButton = (ImageButton)
view.findViewById(R.id.nli_title_eraseImageButton);
    titleSCanvasView.setContent(mActivity, titleEraseImageButton,
mTitleTextView);
```

Referring to the above program, the developer may call values related attributes "TextView", "FrameLayout", "NliSCanvasView", and "ImageButton" written in the XML code. The values may be combined and arranged with values that are called by method "titleSCanvasView.setContent".

The handwriting recognizer 163 recognizes a handwriting image from input information, which is input on the handwriting input layer through an input unit such as a touch pen, etc. The handwriting recognizer 163 may recognize the input handwriting image. The handwriting recognizer 163 may include a recognition management module 164 that processes an overall control for outputting a recognition result from the input information, a remote recognition request module 165, and an area recognition module 166. The remote recognition request module 165 may recognize the handwriting image and transmit the handwriting image input through the pen recognition panel 143 to a server (not shown). The remote recognition module 165 may receive the handwriting image, from the server, as a text that is a recognition result. The area recognition module 165 may include a handwriting recognition block 167 that recognizes information based on the handwriting image. The handwriting recognition block 167 may receive coordinate values of points touched on the pen recognition panel 143, store the coordinate values of the touched points, and generate a stroke array by using a stroke. The handwriting recognition block 167 may recognize the handwriting image using a pre-stored handwriting library and a generated stroke array list.

The handwriting recognizer 163 may determine a data type that recognizes the input handwriting image, in consideration of an attribute of an area of an execution screen of an application corresponding to an area of the handwriting input layer on which the handwriting image has been input through the touch pen. For example, if the application is an application that provides a web screen, the handwriting recognizer 163 may determine a data type that a component of a hypertext markup language (HTML) document in an area of the web screen corresponding to an area of the handwriting input layer on which the handwriting image has been input, as a data type for recognizing the input handwriting image.

The handwriting recognizer 163 may also provide a plurality of handwriting input layers and pre-determine data types for recognizing handwriting images respectively input on the plurality of handwriting input layers. If the handwriting images are respectively input on the handwriting input layers, the handwriting recognizer 163 may recognize the input handwriting images according to the data types respectively pre-determined with respect to the handwriting input layers.

A text that is acquired by recognizing the handwriting image by the handwriting recognizer 163 may be provided to the application operator 161. In another example, if a plurality of handwriting images is respectively input on a plurality of handwriting input layers, the handwriting recognizer 163 may recognize the plurality of handwriting images to generate a plurality of texts, and provide the plurality of texts to the application operator 161.

The application operator 161 may insert the text received from the handwriting recognizer 163 into the input field of the execution screen of the executed application. The application operator 161 may control the display panel 141 to display the input field into which the text has been inserted. As another example, if a plurality of texts is received from the handwriting recognizer 163, the application operator 161 may store the plurality of texts in input fields corresponding to the plurality of texts. The application operator 161 may control the display panel 141 to display a plurality of input fields in which a plurality of texts has respectively been inserted.

Figure 4:
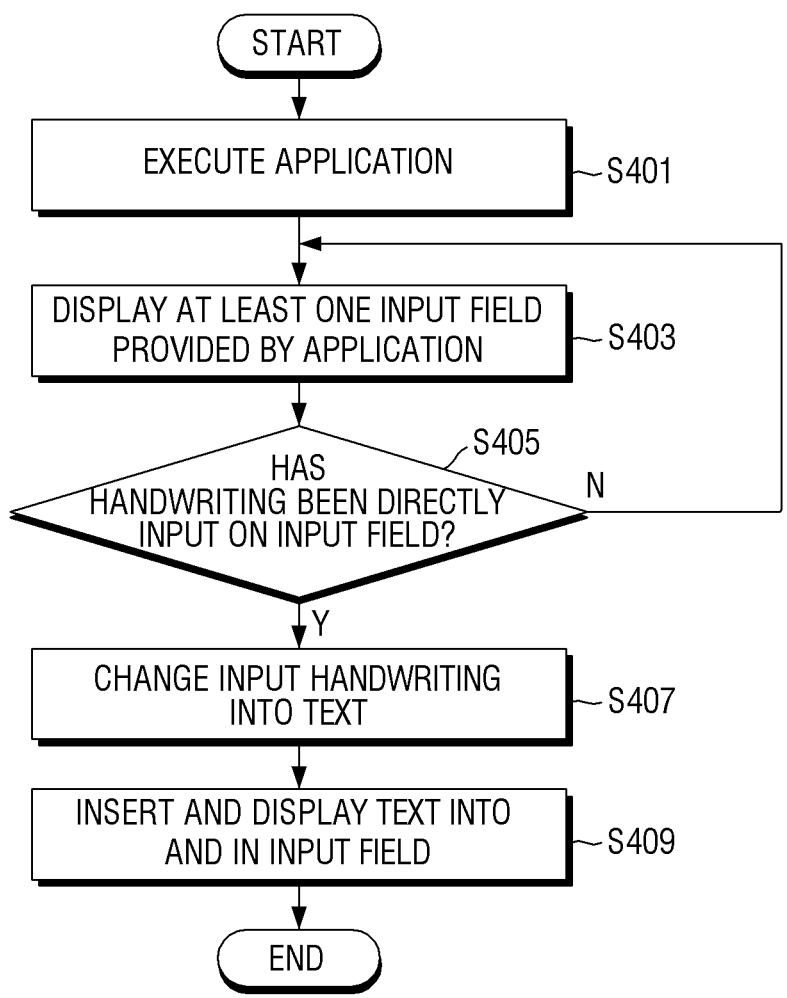
FIG. 4 is a flowchart illustrating a handwriting input method of a portable terminal device according to an exemplary embodiment.

FIG. 4 is a flowchart of a handwriting input method of the portable terminal device 100 according to an exemplary embodiment.

Referring to FIG. 4, in operation S401, the portable terminal device 100 executes a particular application according to a request of a user or when driving a power source.

In operation S403, if the portable terminal device 100 displays an execution screen of an application on the display panel 141, at least one input field provided by the application is displayed on the display panel 141. In other words, the portable terminal device 100 may provide a screen, including at least one input field provided by the application, on the display panel 141.

In operation S405, the portable terminal device 100 receives a handwriting image in the input field by using a touch pen. For example, the portable terminal device 100 may overlap a handwriting input layer with the input layer and provide the handwriting input layer overlapping with the input field in order to receive the handwriting image. The handwriting input layer may be automatically provided when an execution screen including an input field as a virtual layer is displayed on an execution screen of an application for recognizing a handwriting image or when a pre-defined user gesture (for example, a gesture for performing a touch drag from a side of the touch screen 140 toward a center of the touch screen 140 by using a touch pen) is input. Alternatively, the handwriting input layer may be provided when the touch pen is detached from the portable terminal device 100. For example, the virtual layer may be transparent or semi-transparent.

The portable terminal device 100 may receive the handwriting image through the provided handwriting input layer using the touch pen. The handwriting input layer does not need to be limited to a size of the input field. The handwriting input layer may include have a wider area than the input field. In other words, although all of a handwriting image handwritten on an input field by the user does not overlap with the size of the input field, i.e., some of the handwriting image is out of the input field, directly receiving handwriting of the user on the input field using the touch pen refers to receiving all of the handwriting image handwritten by the user (regardless of whether the handwriting image overlaps with the size of the input field).

As another example, an input field may be formed in one row. In this case, a handwriting input layer may be provided to correspond to the one row. In other words, although the user inputs handwriting images in two rows on the handwriting input layer, the portable terminal device 100 may respectively change the handwriting images input in the two rows on the handwriting input layer into texts, combine the texts respectively corresponding to the two rows into one row, and insert the combined text into the input field.

As another example, if an execution screen of an application includes a plurality of input fields, the portable terminal device 100 may provide a plurality of handwriting input layers respectively corresponding to the plurality of input fields. In this case, some of the plurality of handwriting input layers may overlap with one another. Also if handwriting of the user occurs in an overlapping area, the portable terminal device 100 may determine one of the plurality of handwriting input layers the handwriting has occurred on, in consideration of a handwriting input order of the user or a start position of the handwriting. For example, the portable terminal device 100 may determine a handwriting image in the overlapping area as handwriting of a handwriting input layer corresponding to a position in which the handwriting first starts.

In operation S407, the portable terminal device 100 changes a handwriting image input through a handwriting input layer into a text. Further, if a plurality of handwriting images is respectively input through a plurality of handwriting input layers, the portable terminal device 100 may respectively change the plurality of handwriting images into texts.

In operation S409, the portable terminal device 100 may insert the changed text into the input field and display the text inserted into the input field. Further, if a plurality of handwriting images is respectively changed into a plurality of texts respectively corresponding to a plurality of input fields, the portable terminal device 100 may respectively insert the plurality of texts in the plurality of input fields, and display the plurality of texts inserted into the plurality of input fields.

Figure 5:
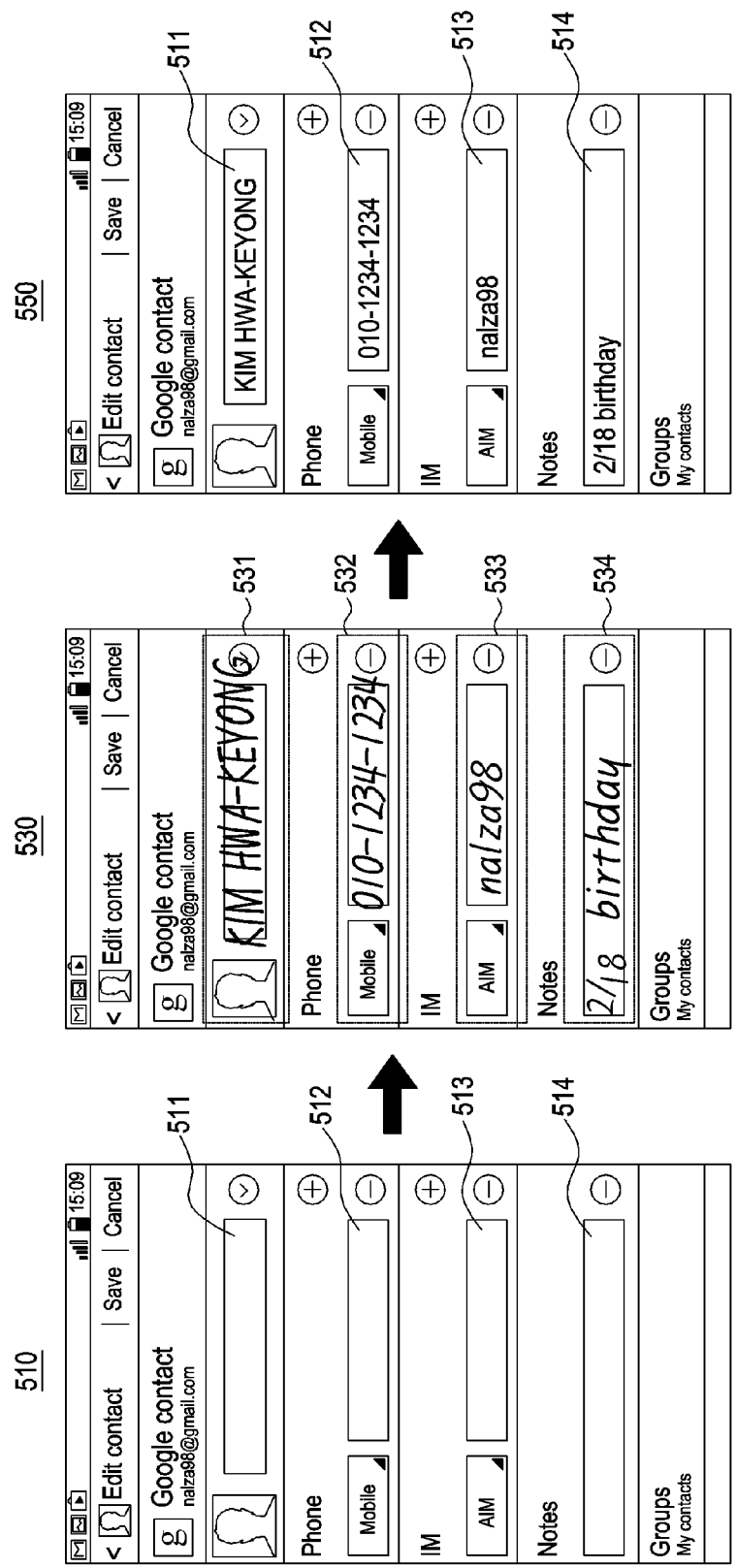
FIG. 5 is a view illustrating a scenario that displays a text in an input field of an application in a portable terminal device, according to an exemplary embodiment.

FIG. 5 is a view illustrating a scenario that displays a text in an input field of an application in the portable terminal device 100, according to an exemplary embodiment.

In operation 510 of FIG. 5, the portable terminal device 100 may display a contact number registration application including a plurality of input fields 511, 512, 513, and 514.

In operation 530 of FIG. 5, the portable terminal device 100 may provide a plurality of handwriting input layers 531, 532, 533, and 534 respectively corresponding to the plurality of input fields 511, 512, 513, and 514. The portable terminal device 100 may receive handwriting inputs of a user through the provided handwriting input layers 531, 532, 533, and 534. In 530 of FIG. 5, the portable terminal device 100 may receive a handwriting image "Kim hwa-kyeong" through the handwriting input layer 531, a handwriting image "010-1234-1234" through the handwriting input layer 532, a handwriting image "nalza98" through the handwriting input layer 533, and a handwriting image "2/18 birthday" through the handwriting input layer 534.

In operation 550 of FIG. 5, the portable terminal device 100 may recognize a plurality of handwriting images and change the plurality of handwriting images into a plurality of texts respectively corresponding to the plurality of handwriting images. The portable terminal device 100 may respectively insert the plurality of texts into the plurality of input fields 511, 512, 513, and 514, and display the plurality of texts inserted into the plurality of input fields 511, 512, 513, and 514. In 550 of FIG. 5, the portable terminal device 100 may insert the text "Kim hwa-kyeong", which is a result of changing the handwriting image input through the handwriting input layer 531, into the input field 511 to display the text "Kim hwa-kyeong" in the input field 511. The portable terminal device 100 may insert the text "010-1234-1234", which is a result of changing the handwriting image input through the handwriting input layer 532, into the input field 512 to display the text "010-1234-1234" in the input field 512. The portable terminal device 100 may insert the text "nalza98", which is a result of changing the handwriting image input through the handwriting input layer 533, into the input field 513 to display the text "nalza98" in the input field 513. The portable terminal device 100 may insert the text "2/18 birthday", which is a result of changing the handwriting image input through the handwriting input layer 534, into the input field 514 to display the text "2/18 birthday" in the input field 514.

Figure 6:
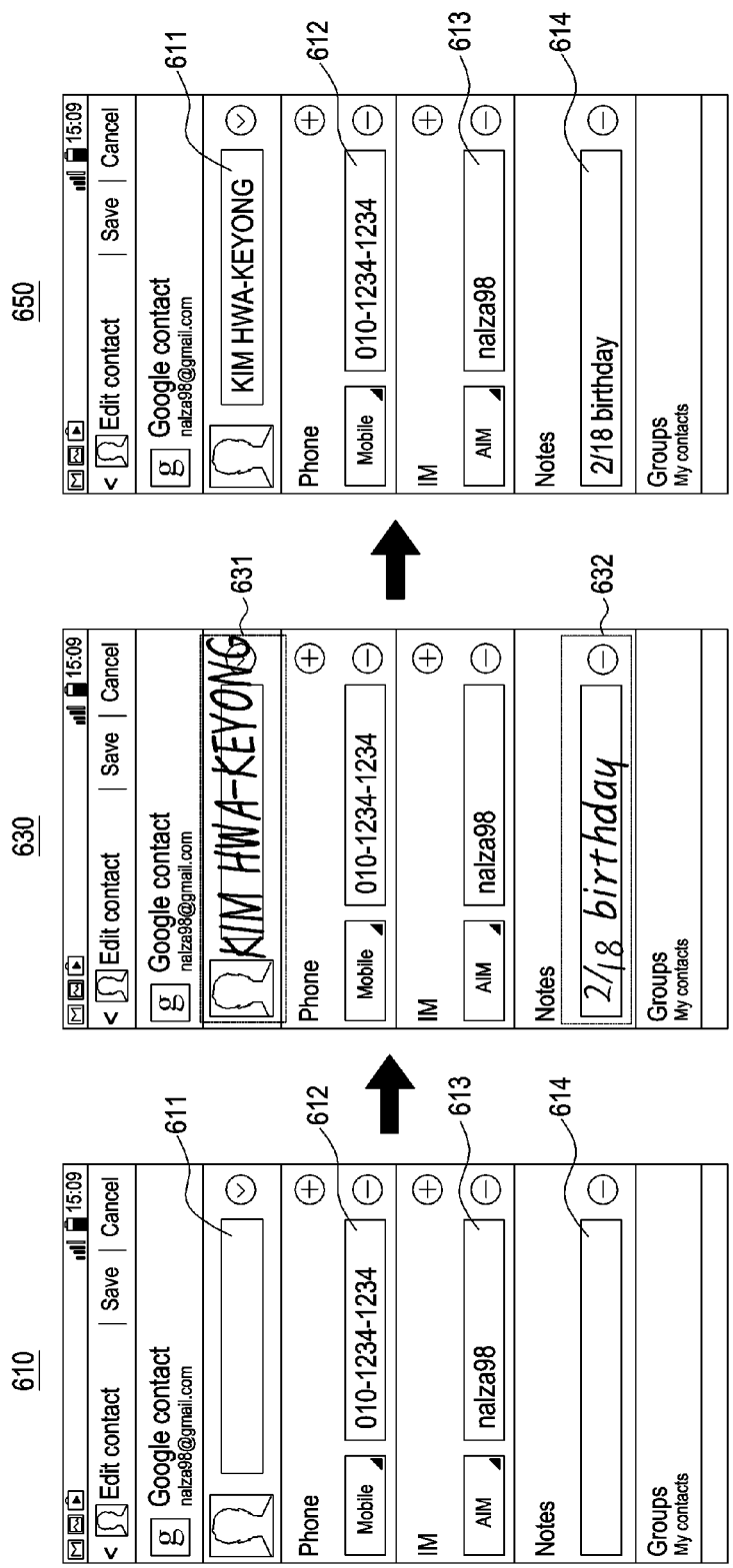
FIG. 6 is a view illustrating a scenario that displays a text in an input field of an application in a portable terminal device, according to another exemplary embodiment.

FIG. 6 is a scenario that displays texts in input fields of an application in the portable terminal device 100, according to an exemplary embodiment.

In operation 610 of FIG. 6, the portable terminal device 100 may display an execution screen of an application including a plurality of input fields 611, 612, 613, and 614. Image texts may be inserted into and displayed in the input fields 612 and 613 of the plurality of input fields 611, 612, 613, and 614. Contents in the input fields 612 and 613 are pre-determined, such that the user does not need to input additional handwriting images in the input fields 612 and 613.

In operation 630 of FIG. 6, the portable terminal device 100 may provide corresponding handwriting input layers 631 and 632 on the input fields 611 and 614. The handwriting input layers 631 and 632 may not be input on the input fields 612 and 613 into which the texts have been inserted. In other words, only a plurality of handwriting input layers 631 and 632 may be provided on the input fields 611 and 614, among the plurality of input fields 611, 612, 613, and 614.

The portable terminal device 100 may receive handwriting inputs of the user through the handwriting input layers 631 and 632. In 650 of FIG. 6, the portable terminal device 100 may respectively insert texts, which are results of changing input handwriting images, into the other input fields 611 and 614.

Figure 7A:
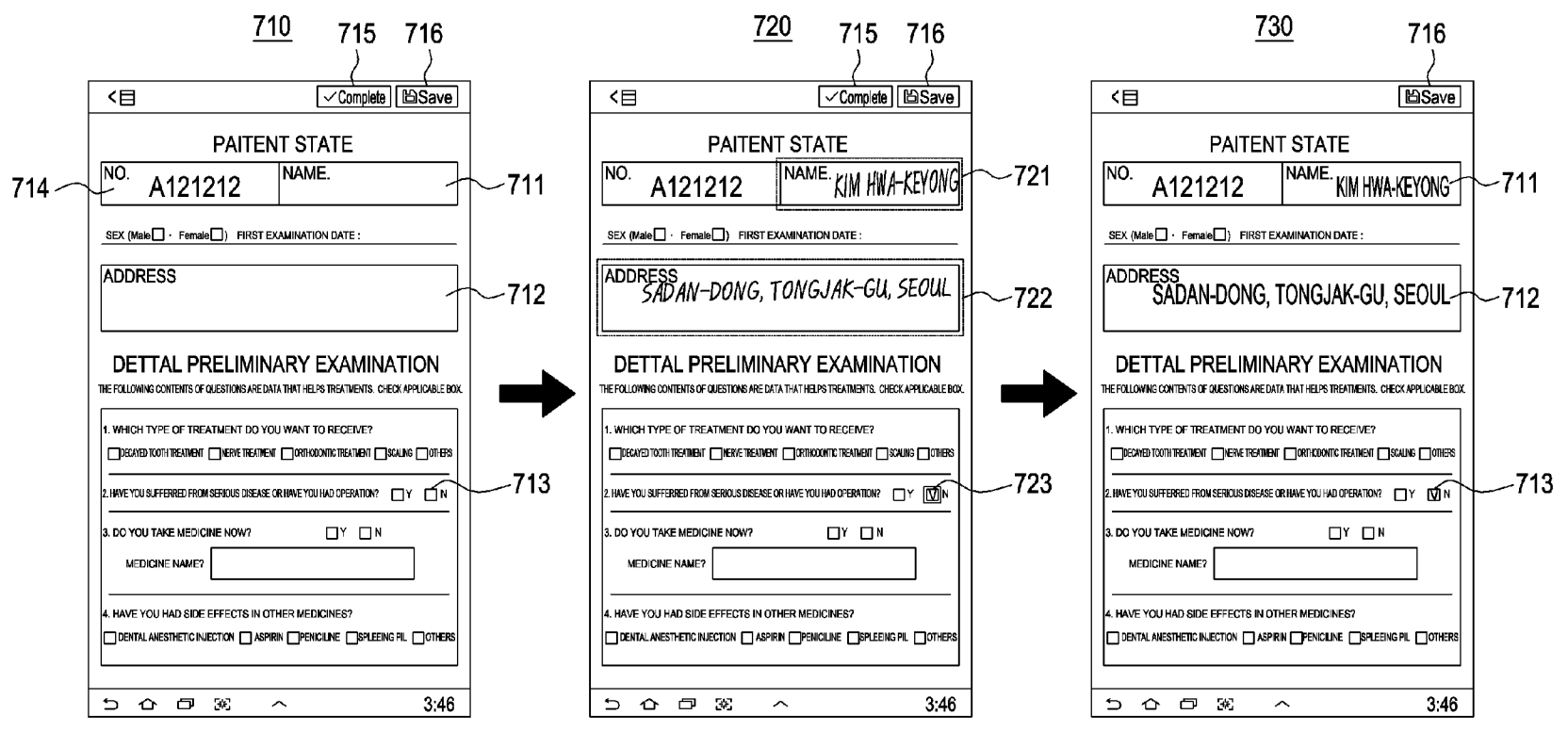
Figure 7B:
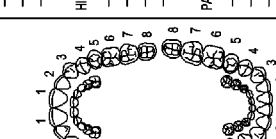

FIGS. 7A and 7B are views illustrating a scenario that displays texts in input fields of a hospital chart application in the portable terminal device 100, according exemplary embodiments.

FIG. 7A illustrates information about a patent recorded on a hospital chart by using a handwriting input method according to an exemplary embodiment.

In operation 710 of FIG. 7A, the portable terminal device 100 may display an execution screen of a hospital chart application including a plurality of input fields. The execution screen may include a complete button 715, a store button 716, and a plurality of input fields 711, 712, 713, and 714. The complete button 715 is a change button that changes a handwriting image input on a hospital chart by a user using a touch pen into a text. Further, if a function of changing a handwriting image into a text is supported, the change button may be referred to as various names such as a complete button, a recognize button, a change button, etc.

The store button 716 is a button that stores the handwriting image input on the hospital chart by the user (for example, a doctor). The plurality of input fields 711, 712, 713, and 714 are areas in which information about a patient or a hospital is recorded. The information about the patient or the hospital may be pre-displayed in the input field 714 of the plurality of input fields 711, 712, 713, and 714.

In operation 720 of FIG. 7A, the portable terminal device 100 may provide a plurality of handwriting input layers 721, 722, and 723 respectively corresponding to the plurality of input fields 711, 712, and 713 on the plurality of input fields 711, 712, and 713. A handwriting input layer may not be provided in the input field 714 in which information is pre-displayed. However, if the user wants to edit a text in the input field 714, a handwriting input layer may be provided in the input field 714 in which the information is pre-displayed. The portable terminal device 100 may respectively receive handwriting inputs of the user through the handwriting input layers 721, 722, and 723.

In operation 720 of FIG. 7, the portable terminal device 100 may respectively receive handwriting inputs respectively corresponding to a name, an address, and a preliminary medical examination item of the patient. If the user selects the complete button 715, the portable terminal device 100 may recognize handwriting images input through the handwriting input layers 721, 722, and 723, and change the handwriting images into texts.

In operation 730 of FIG. 7A, the portable terminal device 100 may recognize the handwriting images input as the information about the patient and acquire a plurality of texts "Kim hwa-kyeong", "Sadang-dong, Tongjak-gu, Seoul", and "√" respectively corresponding to a plurality of handwriting images. The portable terminal device 100 may respectively insert the acquired texts into a plurality of input fields 711, 712, and 713 to display the acquired texts inserted into the plurality of input fields 711, 712, and 713.

FIG. 7B illustrates information about a patient recorded on a hospital chart by using a handwriting input method according to another exemplary embodiments.

In operation 740 of FIG. 7, the portable terminal device 100 may display a hospital chart registration application including a plurality of input fields. The application may include a complete button 745, a store button 746, and a plurality of input fields 741, 742, 743, and 744. The complete button 745 is a button that recognizes a handwriting image input on a hospital chart by a user by using a touch pen, and changes the handwriting image into a text. The store button 746 is a button that stores the handwriting image input on the hospital chart by the user and an image 748 about a patient. The handwriting image input by the user or the image 748 about the patient may be automatically stored at predetermined time intervals without selecting the store button 746. The plurality of input fields 741, 742, 743, and 744 are areas in which information about the patient or a hospital is recorded. The information about the patient or the hospital may be pre-displayed in the input field 742 of the plurality of input fields 741, 742, 743, and 744.

In operation 750 of FIG. 7B, the portable terminal device 100 may provide a plurality of handwriting input layers 751, 753, and 754 respectively corresponding to the plurality of input fields 741, 742, 743, and 744 on the plurality of input fields 741, 742, 743, and 744. A handwriting input layer may not be provided in the input field 742 in which information is pre-displayed. The portable terminal device 100 may respectively receive handwriting images of the user through the handwriting input layers 751, 753, and 754. In 750 of FIG. 7B, the portable terminal device 100 may respectively receive handwriting inputs respectively corresponding to a name and a gender of the patient. If the user selects the complete button 745, the portable terminal device 100 may change the handwriting images input through the handwriting input layers 751, 753, and 754 into texts. An area 753 in which the user does not input handwriting may not be changed into a text.

In operation 760 of FIG. 7B, the portable terminal device 100 may recognize handwriting images input as the information about the patient and acquire a plurality of texts "Kim hwa-kyeong" and "√" respectively corresponding to the plurality of handwriting images. The portable terminal device 100 may respectively insert the acquired texts into the plurality of input fields 741 and 744 to display the texts inserted into the plurality of input fields 741 and 744.

An image changing area 748 is an area in which the user may insert or replace an image about the patient on the hospital chart. The user may select an image button 747 to call or replace the image about the patient. The image may be an image that is stored in the portable terminal device 100 or a storage device (not shown) installed outside the portable terminal device 100, or a photo that is currently captured by the user using the portable terminal device 100. FIG. 7C is a view illustrating images 771, 772, and 773 that may be displayed in the image area of the image area 748, according to an exemplary embodiment. Along with other images, a stored or captured image may be managed as a group, including a plurality of images, similar to a photo album. In this case, if the user performs a particular gesture (for example, a swipe), an image of the image area 748 may be replaced with another image in the same group. For example, images 771, 772, and 773 of FIG. 7C may be managed as one group to be replaced by a particular gesture of the user. If the exemplary embodiments are used in a hospital as described above, a doctor may quickly write a state of a patient on a hospital chart provided by the portable terminal device 100, using a touch pen when the doctor have a face-to-face talk with the patient.

Figure 8A:
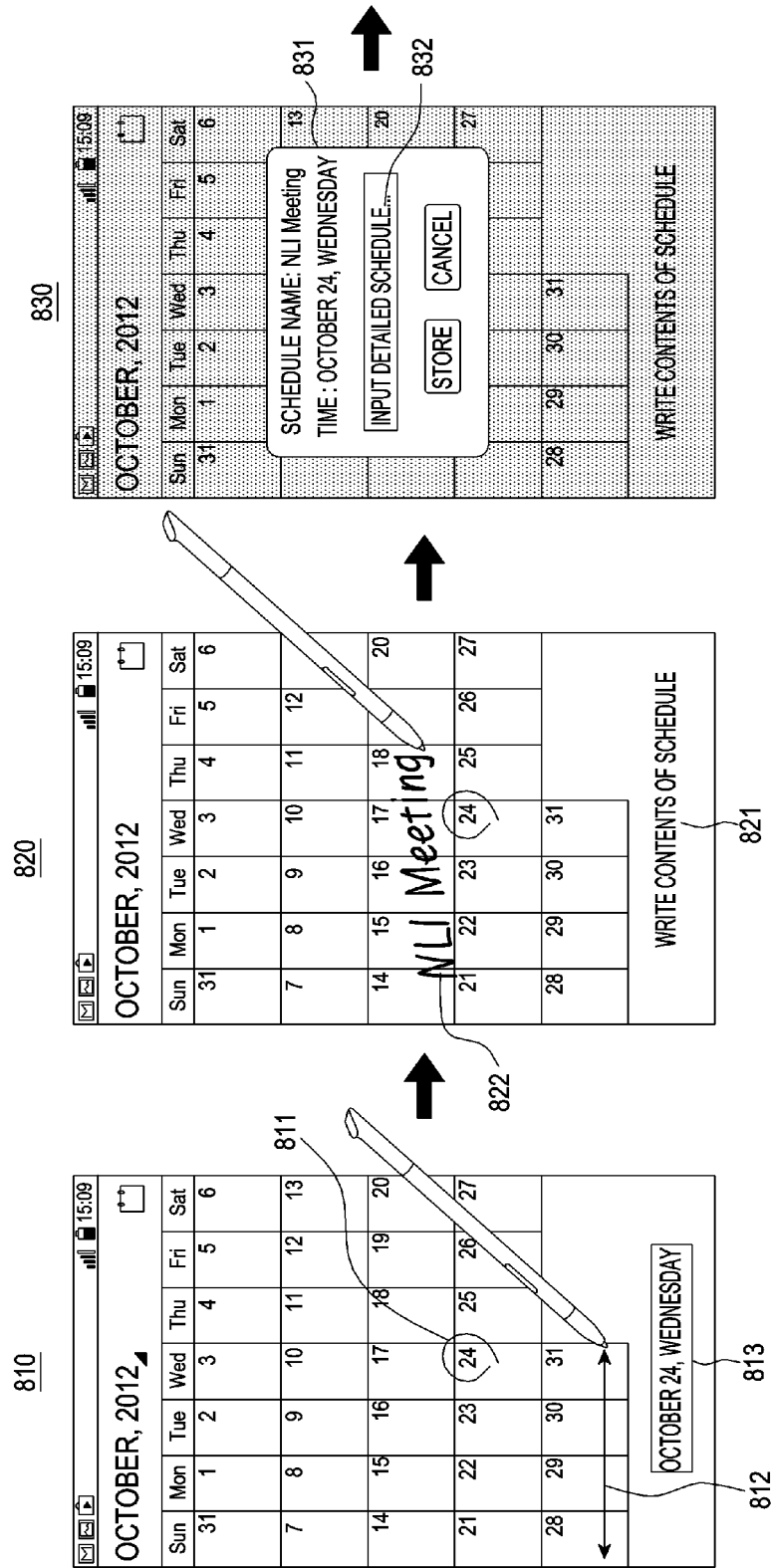
FIGS. 8A and 8B are views illustrating a scenario that displays a text in an input field of a schedule management application in a portable terminal device, according to an exemplary embodiment.
Figure 8B:
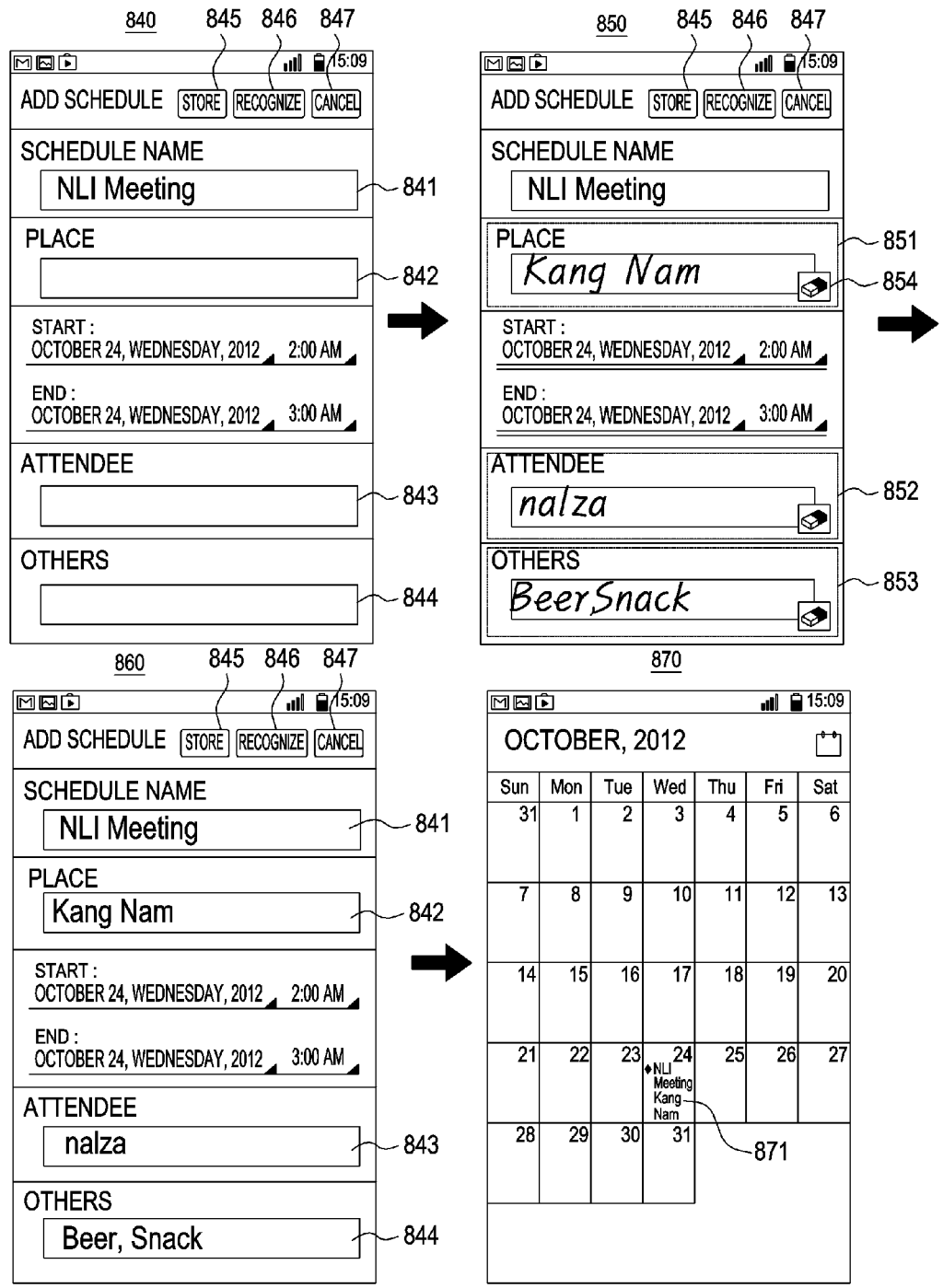

FIGS. 8A and 8B are views illustrating a scenario that displays a text in an input field of a schedule management application in the portable terminal device 100, according to an exemplary embodiment.

In operation 810 of FIG. 8A, the portable terminal device 100 may display a plurality of times provided by an application. For example, the plurality of times may be a calendar provided by the application. A user may select a particular time of the plurality of times at which the user wants to write a predetermined content. For example, the user may mark 811 one of the dates of the calendar to select the particular time. Alternatively, the user may drag 812 a plurality of dates of the dates of the calendar with a touch pen to select the particular time. The user may also input 813 a date that the user wants to select, into an area of a screen.

If the user selects a time in the portable terminal device 100 in 820 of FIG. 8A, the portable terminal device 100 may provide a feedback 821 that requests a content of a schedule related to the selected time. The user may write a name 822 of the schedule related to the selected time in an arbitrary area of the screen.

If the portable terminal device 100 receives a name of the schedule in 830 of FIG. 8A, the portable terminal device 100 may provide a popup window 831 that requests a detailed schedule input. If the user selects an input field 832 for inputting a detailed schedule, the portable terminal device 100 may further provide a screen on which the detailed schedule may be input.

In operation 840 of FIG. 8B, the portable terminal device 100 may display a screen including a plurality of input fields 841, 842, 843, and 844 as the screen that requests the detailed schedule. The name 822 of the schedule that has been input in 820 of FIG. 8A may be recognized and displayed as a text in the input field 841 of the plurality of input fields 841, 842, 843, and 844 in which a name of a schedule is to be written. In 840 of FIG. 8B, a recognize button 846 is used to start recognizing a handwriting image handwritten in each input field by the user, changing the handwriting image into a text, and inserting the text into the input field. A store button 845 stores a state of the input field into which the text has been inserted. A cancel button 847 returns a state of an input field into which an image text has been inserted, to a state in which a previous text has not been inserted.

In operation 850 of FIG. 8B, the portable terminal device 100 may provide corresponding handwriting input layers 851, 852, and 853 on the input fields 842, 843, and 844. However, handwriting input layers 851, 852, and 853 are not provided on the input field 841 in which the text has been inserted. The user may input a schedule-related place, schedule-related attendees, and schedule-related other contents on the provided handwriting input layers 851, 852, and 853 using the touch pen. If the user wants to re-input a handwriting image, the user may select the delete button 854 to delete a content handwritten in the handwriting input layer 851. If the delete button 854 is selected, all handwritings handwritten in the handwriting input layer 851 may be deleted, or a recently handwritten stroke of the handwritings may be deleted from the handwriting input layer 851. If a plurality of handwriting input layers are provided, delete buttons may be provided to respectively correspond to the plurality of handwriting input layers in order to respectively delete handwriting images from the plurality of handwriting input layers. Alternatively, one delete button may be provided to delete all of the handwriting images from the plurality of handwriting input layers.

In operation 860 of FIG. 8B, the portable terminal device 100 may respectively receive handwriting images about a schedule-related place, a schedule-related attendee, and schedule-related other contents in the handwriting input layers 851, 852, and 853, and change the handwriting images into texts. Further, if there is no handwriting input of the user for a predetermined time, the portable terminal device 100 may start recognizing handwriting or may change a handwriting image into a text at every predetermined time interval. Alternatively, when the user select the recognize button 846, the portable terminal device 100 may include the recognize button 846 to change a plurality of handwriting images respectively input into the plurality of handwriting input layers 851, 852, and 853 into texts. The portable terminal device 100 may insert texts acquired through recognitions into the input fields 842, 843, and 844 and display the texts inserted into the 842, 843, and 844.

In operation 870 of FIG. 8B, if an input of the user performed by using the touch pen to add a detailed schedule is completed, the portable terminal device 100 may display at least a portion of the schedule at a time selected by the user. For example, if a plurality of times provided by an application is a calendar, the portable terminal device 100 may display a predetermined name and a predetermined place 871 in a blank related to a particular date included in the calendar.

According to another exemplary embodiment of FIGS. 8A, and 8B, if the portable terminal device 100 displays the plurality of times provided by the application execution screen as in 810 of FIG. 8A, and the user selects one of the plurality of times, operations 820 and 830 of FIG. 8A may be omitted, and operation 840 of FIG. 8B may be immediately performed. In other words, if the user selects one of the plurality of times, the portable terminal device 100 may display contents related to the selected time in the input fields 841, 842, 843, and 844. The portable terminal device 100 may respectively provide handwriting input layers respectively corresponding to the other input fields including the schedule name input field 841. The portable terminal device 100 may respectively receive handwriting images in the provided handwriting input layers, recognize the handwriting images as texts, insert the texts into the input fields, and display the texts.

The exemplary embodiments may actively use documents that comply with predetermined formats having input fields. In particular, if the exemplary embodiments are applied to a public office document, convenience and speed may be provided to a user. In a related art, a civil petitioner writes information necessary for a civil complaint on a public office document with a pen in a public office. Also, an employee in the public office re-inputs contents written by the civil petitioner on a computer of the public office after seeing the contents written in the office document written by the civil petitioner. However, if the exemplary embodiments are applied, a civil petitioner may easily write information necessary for a civil complaint through a public office document application provided in the portable terminal device 100 in a public office or in a home. In other words, in the exemplary embodiments, the civil petitioner may input the information necessary for the civil complaint using a touch pen, which is similar to performing handwriting in the public office document with a pen. In this case, waste of paper related to the public office document may be saved. Further, the employee in the public office may not have to go through the trouble of re-inputting the contents on a computer, based on the contents written by the civil petitioner. In particular, if an authentication of a user is confirmed in the portable terminal device 100 before a public office document application is displayed, basic personal information of the user may be inserted on and displayed in a portion of an input filed of a public office document. This may save the user the trouble of writing the same contents, such as the personal information, each time.

Figure 9A:
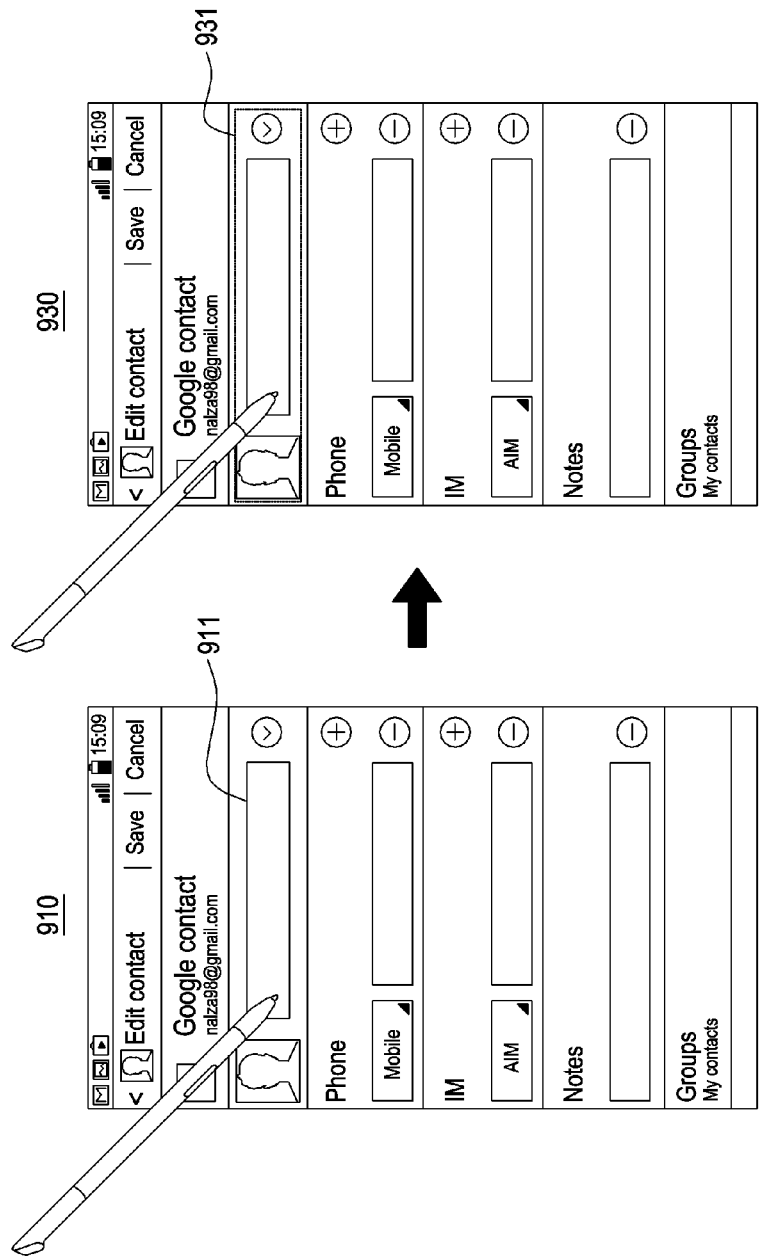
FIGS. 9A and 9B are views illustrating methods of displaying a text in an input field in a portable terminal device, according to an exemplary embodiment.
Figure 9B:
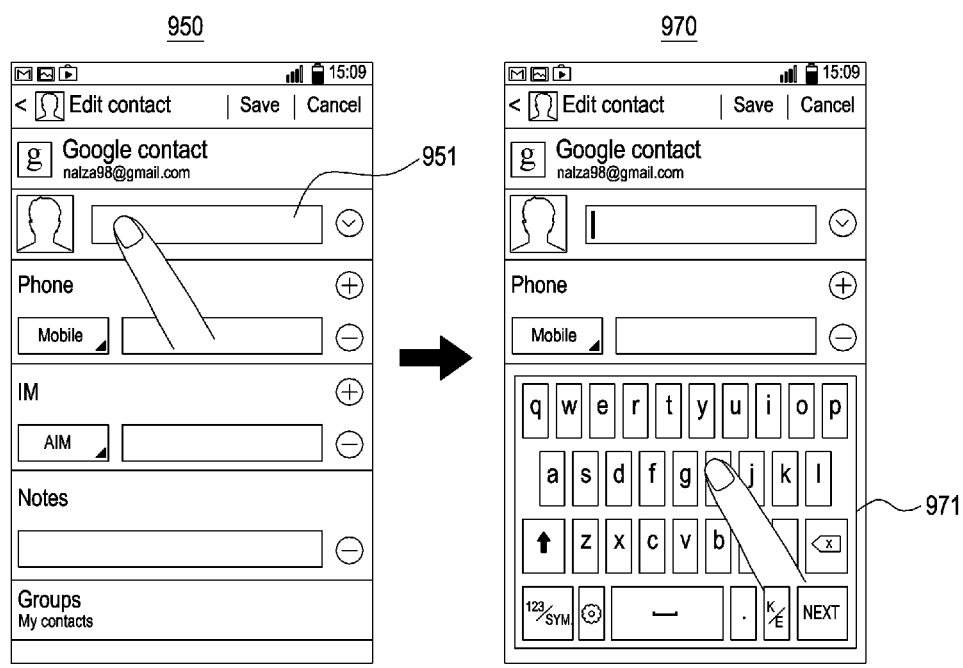

FIGS. 9A and 9B are views illustrating methods of displaying a text in an input field in the portable terminal device 100, according to an exemplary embodiment.

FIG. 9A illustrates a touch of a user that is performed using a touch pen. FIG. 9B illustrates a touch of a user that is performed by using a finger of the user.

In operation 910 of FIG. 9A, the portable terminal device 100 may display an application including an input field 911 on a touch screen 140. If the user touches the input field 911 using the touch pen or withdraws the touch pen from the portable terminal device 100, the portable terminal device 100 may provide a handwriting input layer 931 for inputting a handwriting through the touch pen on the input field 911 (as shown in operation 930 of FIG. 9A).

As another example, in operation 950 of FIG. 9B, the portable terminal device 100 may display an application including an input field 951 on the touch screen 140.

If the user touches the input field 951 using a finger, the portable terminal device 100 may provide a keypad 971 for receiving inputs performed using the finger in an area of a screen (as shown in operation 970 of FIG. 9B).

Figure 10:
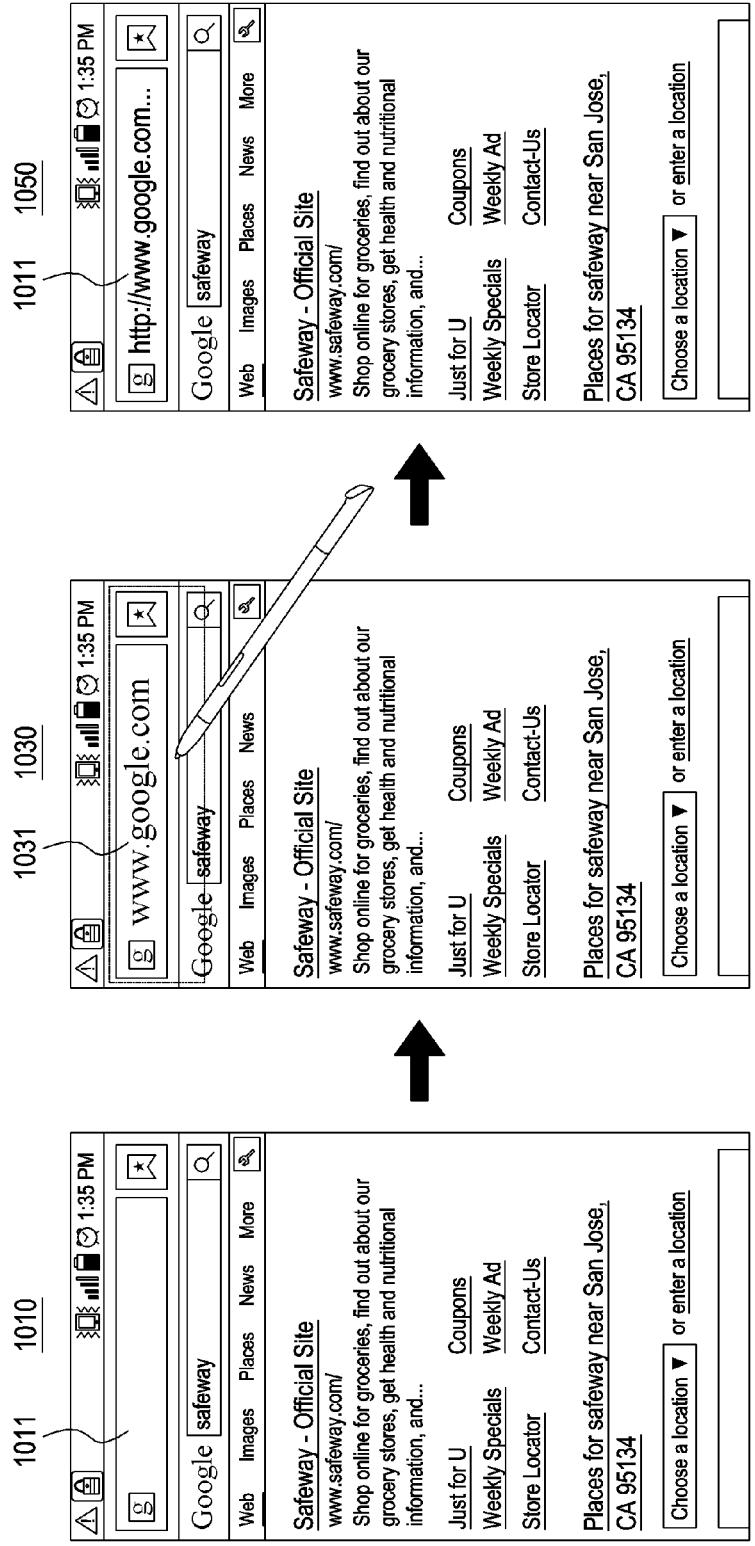
FIG. 10 is a view illustrating a scenario that displays a text in an input field of a web browser application in a portable terminal device, according to an exemplary embodiment.

FIG. 10 is a view illustrating a scenario that displays a text in an input field of a web browser application in the portable terminal device 100, according to an exemplary embodiment.

In operation 1010 of FIG. 10, the portable terminal device 10 may display a web browser application including an input field 1011 for inputting a website address.

In operation 1030 of FIG. 10, the portable terminal device 100 may provide a handwriting input layer 1031 on the input field 1011. The handwriting input layer 1031 may be greater than the input field 1011. In this case, a user may perform a touch drag gesture on the handwriting input layer 1031 or may adjust a size of the handwriting input layer 1031 using an additional menu. If the user is old and infirm, who has weak or poor eyesight, this function may improve accessibility for inputting a handwriting image by the user.

The portable terminal device 100 may respectively receive handwriting inputs of the user through the provided handwriting input layer 1031. In operation 1030 of FIG. 10, the portable terminal device 100 may receive a handwriting image "www.abcdefg.com" of the user through the handwriting input layer 1031. The handwriting image is an image that is arbitrarily written only for descriptive purposes. Thus, the handwriting image has no other intentions in an image content thereof.

In operation 1050 of FIG. 10, the portable terminal device 100 may recognize the handwriting image to acquire the handwriting image as a text. The portable terminal device 100 may insert the texts into the input field 1011 and display the texts inserted into the input field 1011. In 1050 of FIG. 5, the portable terminal device 100 may insert the text "www.abcdefg.com", which is a result of recognizing handwriting input through the handwriting input layer 1031, into the input field 1011 and access a webpage related to the text.

Figure 11:
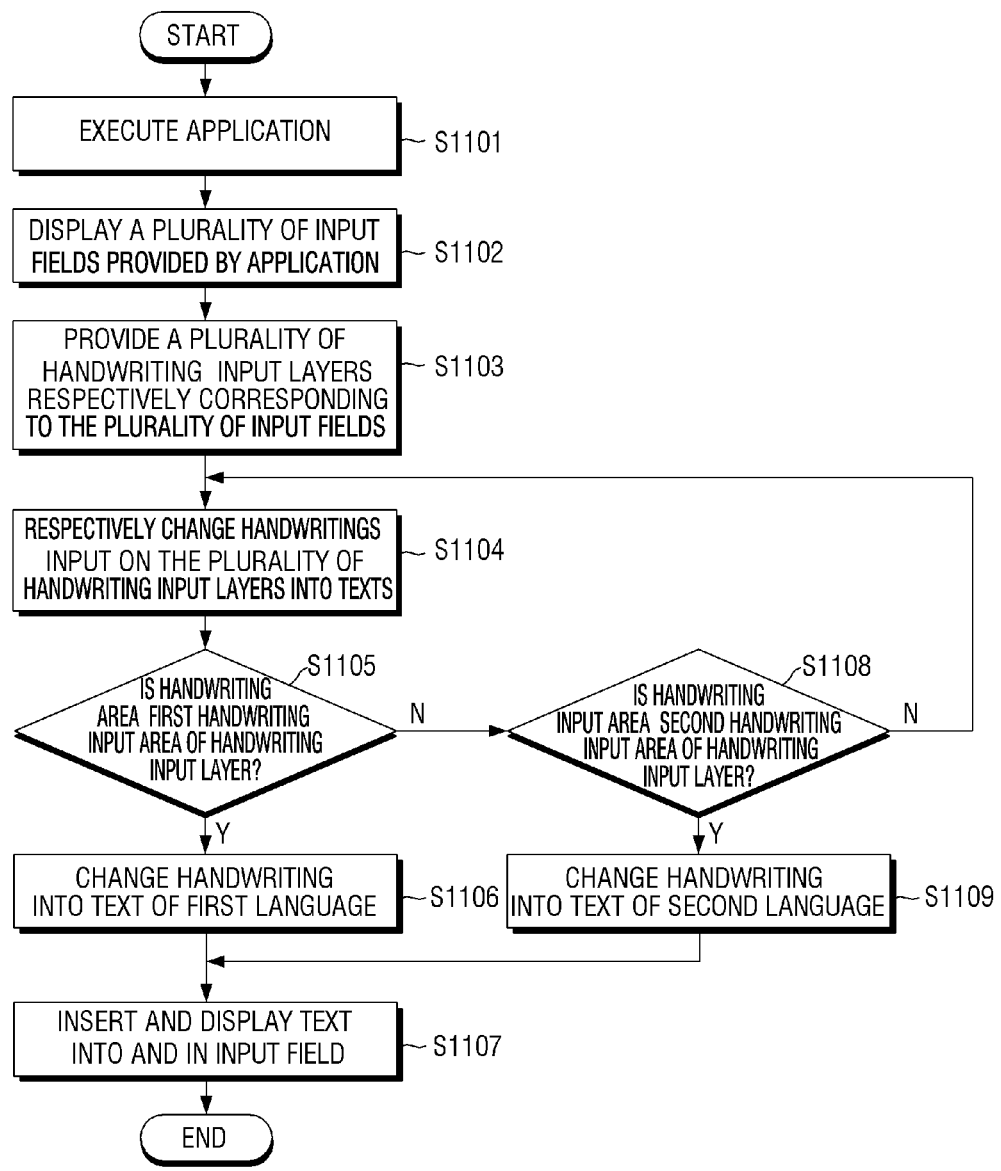
FIG. 11 is a flowchart illustrating a handwriting input method of a portable terminal device according to another exemplary embodiment.

FIG. 11 is a flowchart illustrating a handwriting input method of the portable terminal device 100, according to another exemplary embodiment.

Referring to FIG. 11, in operation S1101, the portable terminal device 100 executes a particular application to display the particular application on the touch screen 140. In operation S1102, a plurality of input fields, provided by the particular application, are displayed on the touch screen 140. In operation S1103, the portable terminal device 100 provides a plurality of handwriting input layers respectively corresponding to the plurality of input fields to receive handwriting inputs of a user.

In operation S1104, the portable terminal device 100 respectively receives handwriting images on the plurality of handwriting input layers through a touch pen and changes the handwriting images into texts. In this case, the portable terminal device 100 may change the handwriting images respectively input on the handwriting input layers into the texts having a first type among a first language, a second language, numbers, and special symbols. For example, if a type of a text to be inserted into an input field corresponding to a first handwriting input layer is determined as the first language (for example, Korean alphabet), and a type of a text to be inserted into an input field corresponding to a second handwriting input layer is determined as a second language (for example, English), the portable terminal device 100 determines whether a handwriting input layer is the first handwriting input layer in operation S1105, and changes a handwriting image input through the first handwriting input layer into a text of the first language in operation S1106. If the handwriting input layer is not the first handwriting input layer, the portable terminal device 100 determines whether the handwriting input layer is the second handwriting input layer in operation S1108. In operation S1109, the portable terminal device 100 changes a handwriting image input through the second handwriting input layer into a text of the second language.

In operation S1107, the portable terminal device 100 inserts the texts, which have been recognized to respectively correspond to the plurality of handwriting input layers, into the plurality of input fields, and displays the texts inserted into the plurality of input fields.

Figure 12:
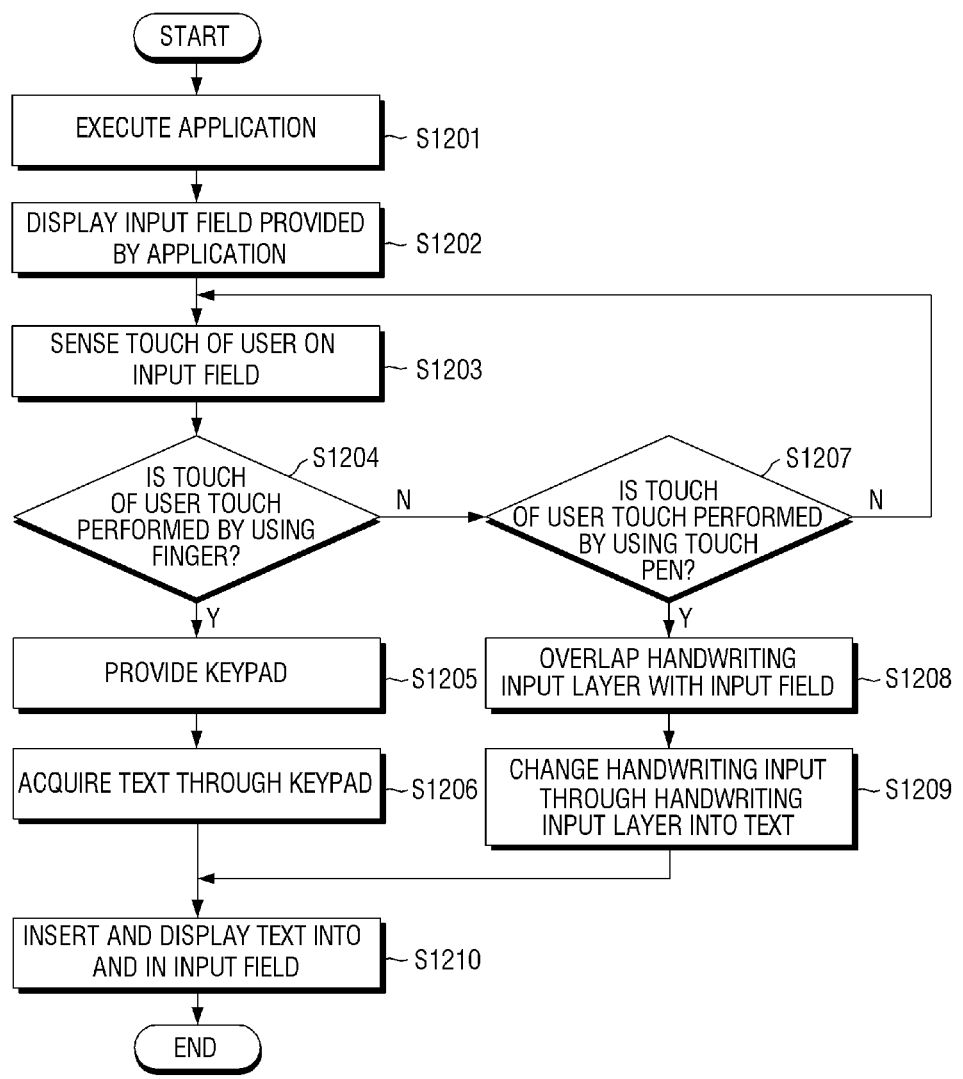
FIG. 12 is a flowchart illustrating a handwriting input method of a portable terminal device according to another exemplary embodiment.

FIG. 12 is a flowchart illustrating a handwriting input method of the portable terminal device 100, according to another exemplary embodiment.

Referring to FIG. 12, in operation S1201, the portable terminal device 100 executes a particular application to display the particular application on the touch screen 140. In operation S1202, an input field provided by the particular application is displayed on the touch screen 140.

In operation S1203, the portable terminal device 100 senses a touch of a user on the input field. In operation S1204, the portable terminal device 100 determines whether the touch of the user has been performed using a finger. If the touch of the user is a touch performed using the finger, the portable terminal device 100 provides a keypad for receiving an input performed using the finger in an area of a screen in operation S1205. In operation S1206, the portable terminal device 100 acquires a text that is selected through the keypad by the user. In operation S1210, the portable terminal device 100 inserts acquired texts into an input field provided by the particular application, and displays the acquired texts inserted into the input field.

In operation S1207, if the touch of the user is not the touch performed using the finger, the portable terminal device 100 determines whether the touch of the user is a touch performed using a touch pen. Operation S1207 may be performed simultaneously with operation S1204, or operation S1204 may be performed after operation S1207. If the touch of the user is a touch performed using a touch pen, the portable terminal device 100 overlaps a handwriting input layer for receiving an input performed using the touch pen with the input field, and provides the handwriting input layer overlapping with the input field in operation S1208. In operation S1209, the portable terminal device 100 recognizes a handwriting image input through the handwriting input layer to change the handwriting image into a text. In operation S1210, the portable terminal device 100 inserts the text into the input field provided by the particular application, and displays the text inserted into the input field.

Figure 13:
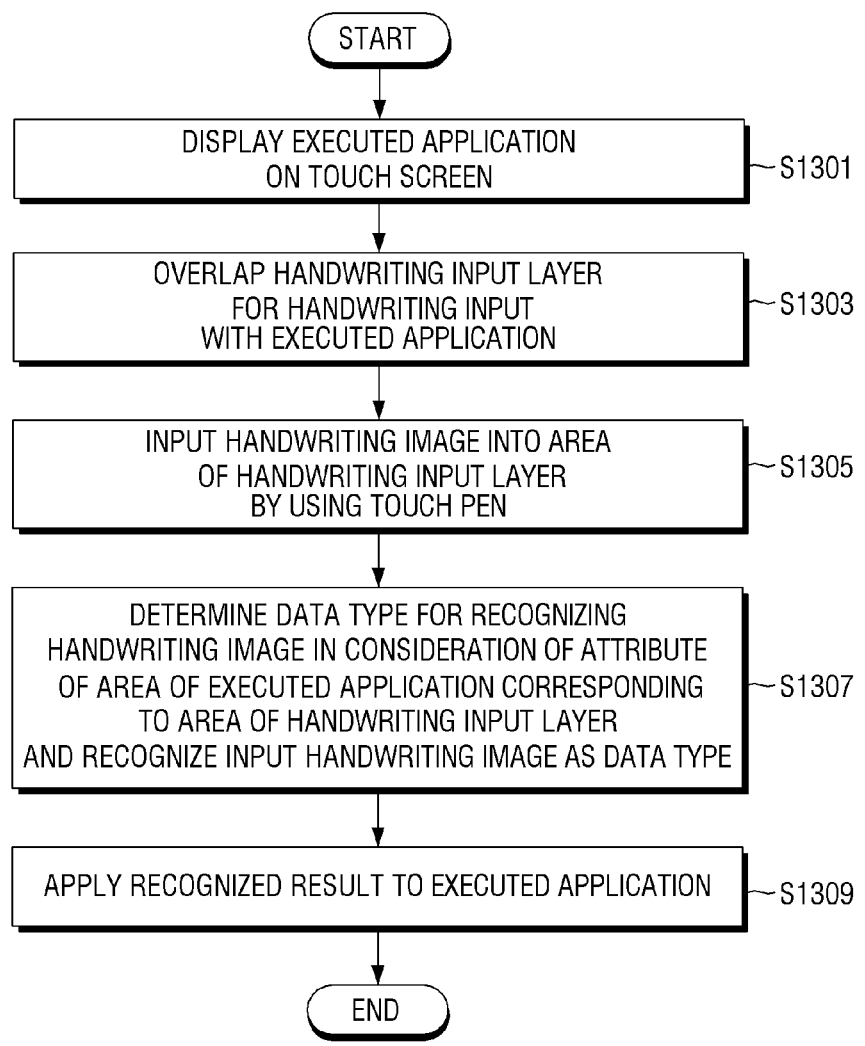
FIG. 13 is a flowchart illustrating a handwriting input method of a portable terminal device according to another exemplary embodiment.

FIG. 13 is a flowchart illustrating a handwriting input method of the portable terminal device 100, according to an exemplary embodiment.

Referring to FIG. 13, in operation S1301, the portable terminal device 100 executes a particular application according to a request of a user or when driving a power source, and displays the executed particular application on the touch screen 140.

In operation S1303, the portable terminal device 100 overlaps a handwriting input layer for receiving a handwriting input with the executed particular application and provides the handwriting input layer overlapping with the executed particular application. The portable terminal device 100 may respond to a gesture predetermined on the touch screen 140 to provide the handwriting input layer for receiving the handwriting input. The predetermined gesture may be a touch drag gesture using a touch pen or a gesture of touching a side of the touch screen 140, and dragging the side toward a center.

In operation S1305, the controller 160 of the portable terminal device 100 receives a handwriting input in an area of the provided handwriting input layer using a touch pen.

In operation S1307, the controller 160 of the portable terminal device 100 determines a data type for recognizing the input handwriting image in consideration of an attribute of an area of the executed particular application corresponding to an area of the handwriting input layer and recognizes the input handwriting images through the data type. For example, if the executed particular application is a web application provided from a server positioned outside the portable terminal device 100, the controller 160 may determine data that a component of an HTML document may receive in an area of the web application corresponding to the area of the handwriting input layer, as a data type for recognizing the input handwriting image and recognize the input handwriting image through the determined data type. In other words, the controller 160 may determine an input box of the component of the HTML document corresponding to the area of the handwriting input layer is a text input box, an image input box, a table selection box, or a number input box. The controller 160 may recognize an image handwritten in the area of the handwriting input layer as the data type according to a type of data that may be input in the determined input box.

In operation S1309, the controller 160 of the portable terminal device 100 applies the recognition result to the executed particular application.

For example, if an area of an application corresponding to an area of a handwriting input layer includes a text input field, and an input box of a component of the area is a text input box, the controller 160 may recognize a handwriting image input in the area of the handwriting input layer as a text. The controller 160 may display the recognized result in the input field.

As another example, if a component of an area of an application corresponding to an area of a handwriting input layer includes a number input field, and an input box of the component of the area is a number input box, the controller 160 may recognize a handwriting image input in the area of the handwriting input layer as a number and a numerical formula. The controller 160 may also display a result, which is obtained by calculating the recognized numbers according to the numerical formula, in the number input field.

As another example, if an area of an application corresponding to an area of a handwriting input layer includes a map image, the controller 160 may recognize a handwriting image input in the area of the handwriting input layer according to a data type that an input box of a component of the area may receive. For example, the input box of the component is an image input box, the controller 160 may display the handwriting image input in the area of the handwriting input layer on the map image. As another example, if the input box of the component is a text input box, the controller 160 may recognize the handwriting image input in the area of the handwriting input layer as a text. The controller 160 may also determine the recognized text as a position that the user wants to search for and display a new map image including the position on the touch screen 140.

As another example, if an area of an application corresponding to an area of a handwriting input layer includes a table including a plurality of cells, and an input box of a component of the area is a cell selection input box, the controller 160 may recognize a handwriting image input in the area of the handwriting input layer as a command that is to select at least one of the plurality of cells. If a handwriting image is additionally input on the handwriting input layer by using a touch pen, the controller 160 may recognize the additionally input handwriting image as a text and display the recognized text on at least one of cells selected by the command.

A handwriting image input on a handwriting input layer using a touch pen or data as a recognized result of the handwriting image may be stored as input data of the above-described applications or data of the handwriting input layer. For example, the handwriting image input on the handwriting input layer may be connected to the handwriting input layer to be stored as an image form. Also, the handwriting input layer on which the handwriting image has been displayed may be transmitted to another device or another user, or may be provided on an application that is being executed according to a request of the user. As another example, if a value, which is obtained by recognizing a handwriting image stored as input data of applications, may reflect the stored result value to be displayed on the application if the application is re-executed.

The handwriting image input on the handwriting input layer using the touch pen may be respectively recognized as a plurality of data types. For example, the handwriting image input on the handwriting input layer may be recognized as a text and an image. A plurality of recognized results may be stored in the storage unit 150. Information about applications that are being executed when the plurality of handwriting images are recognized may be stored along with the plurality of recognized results in the storage unit 150. Alternatively, at least one of the plurality of recognized results may be applied to an application that is being executed, and another recognized result may be stored in the storage unit 150. If handwriting images input on a handwriting input layer are stored as a text in the storage unit 150, the stored text may be searched according to a search request of the user. Also, an application that has been executed when the handwriting images corresponding to the text as the search result may be re-executed, and the searched text may be applied to the re-executed application.

Figure 14A:
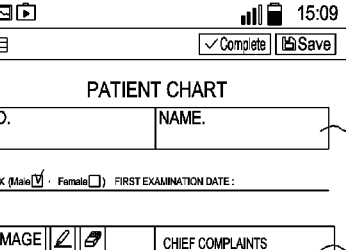

FIGS. 14A and 14B are views illustrating a scenario that displays a text or an image in a hospital chart application in the portable terminal device 100, according to an exemplary embodiment.

In operation 1410 of FIG. 14A, the portable terminal device 100 may execute a hospital chart application. The hospital chart application may include a plurality of input fields 1411 through 1415 and an image 1416 about a patient. The portable terminal device 100 may detect a predetermined touch drag gesture 1419 performed on the hospital chart application using a touch pen. Instead of the touch pen, a portion (for example, a finger) of a hand of a user may be used.

In operation S1430 of FIG. 14A, the portable terminal device 100 may respond to a detected gesture to overlap a handwriting input layer 1431 with the hospital chart application to provide the handwriting input layer 1431 overlapping with the hospital chart application. The handwriting input layer 1431 may be provided to be transparent, semi-transparent, or opaque.

In operation S1450 of FIG. 14B, the portable terminal device 100 may receive handwriting input images 1451 through 1454 on the handwriting input layer 1431 using the touch pen. The portable terminal device 100 may also recognize the handwriting images 1451 through 1454 in consideration of an attribute of an area of the application corresponding to at least an area of each of the handwriting input images 1451 through 1454 input on the handwriting input layer 1431. A position and a size of at least an area of a handwriting input layer may respectively correspond to a position and a size of at least an area of the application corresponding to the at least area.

Figure 15:
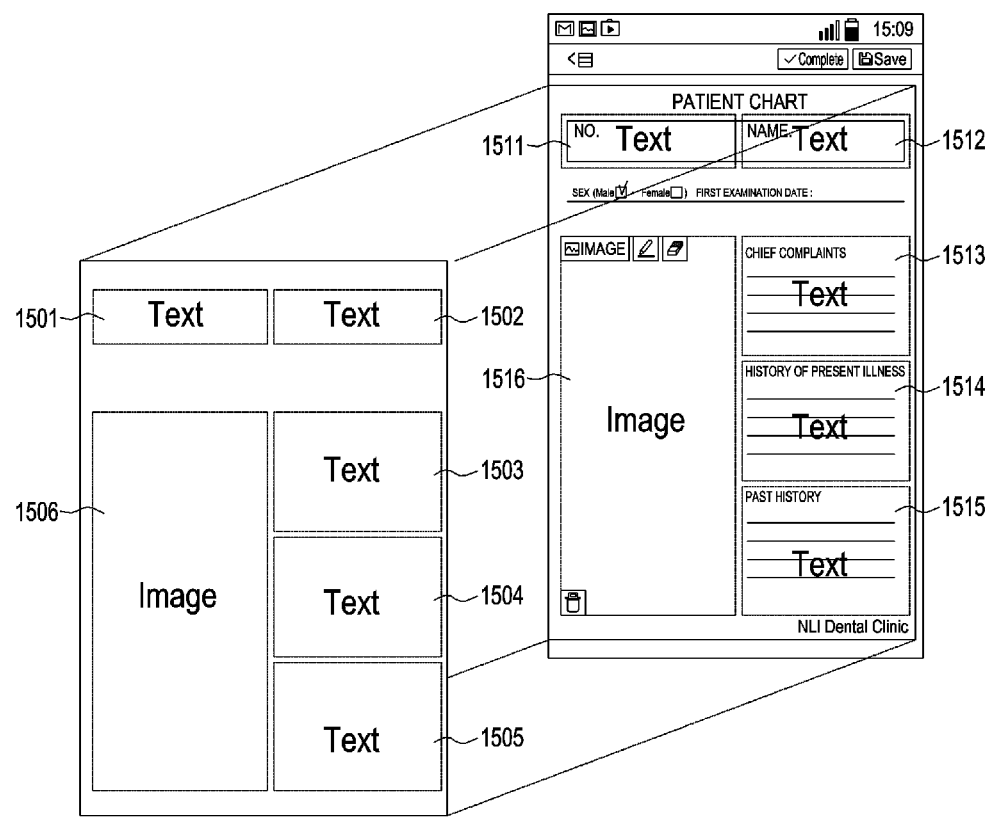
FIG. 15 is a view illustrating a plurality of areas of a handwriting input layer corresponding to a plurality of areas of an application according to an exemplary embodiment.

Referring to FIG. 15, a plurality of areas of an application that is being executed may respectively correspond to a plurality of areas of a handwriting input layer in consideration of positions and sizes between the plurality of areas. For example, a plurality of areas of a handwriting input layer may respectively correspond to a plurality of areas of an executed application respectively overlapping with the plurality of areas of the handwriting input layer, underneath the handwriting input layer. FIG. 15, a first area 1511 of an executed application may correspond to a first area 1501 of a handwriting input layer. Similarly, a second area 1512, a third area 1513, a fourth area 1514, a fifth area 1515, and a sixth area 1516 of the application may respectively correspond to a second area 1502, a third area 1503, a fourth area 1504, a fifth area 1505, and a sixth area 1506 of the handwriting input layer. Input boxes of components of the first through fifth areas 1511 through 1515 may be text input boxes for inputting texts. In this case, handwriting images input into the first through fifth areas 1501 through 1505 of the handwriting input layer may be recognized as texts that may be input into the text input boxes. The input box of the component of the sixth area 1516 of the application may be an image input box for inputting an image. In this case, the handwriting image input into the sixth area 1506 of the handwriting input layer may be recognized as an image that may be input into the image input box.

In operation 1470 of FIG. 14B, the portable terminal device 100 may apply a recognized result of the handwriting image to an executed hospital chart application. For example, the handwriting image 1451 input into the second area 1502 of the handwriting input image may be recognized as a text, and a text 1471 that is a recognized result may be inserted into the input field 1412 of the second area 1512 to be displayed in the input field 1412. Also, the handwriting images 1452, 1453, and 1454 input into the sixth area 1506 of the handwriting input layer may be recognized as images, and images 1472, 1473, and 1474 that are recognized results may be displayed in the sixth area 1516 of the application corresponding to the area 1506 of the handwriting input layer.

Figure 16B:
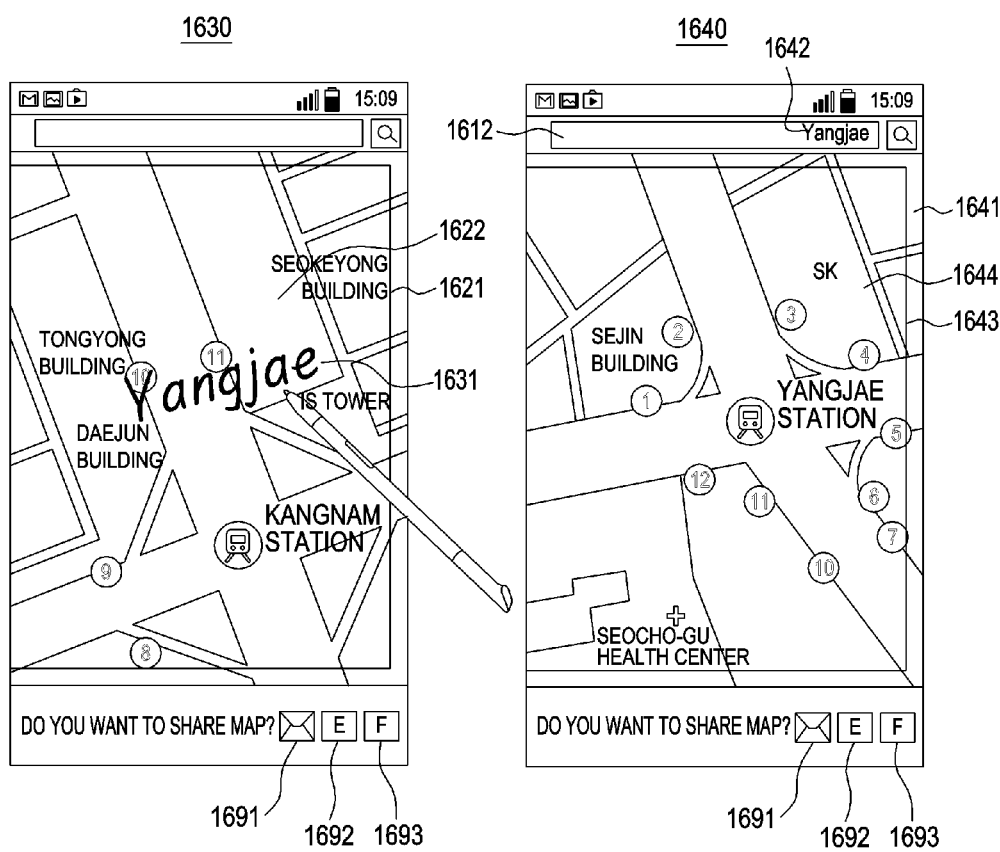

FIGS. 16A through 16C are views illustrating a scenario that applies a recognized result of a handwriting image to a search application in the portable terminal device 100, according to an exemplary embodiment.

In operation 1610 of FIG. 16A, the portable terminal device 100 may execute a search application. Examples of the search application may include a web search application, a map search application, etc. In exemplary embodiments, the map search application will be described. The map search application may display a map image 1611 and a search field 1612 for searching for a position on a touch screen. The portable terminal device 100 may also detect a touch drag gesture 1619 predetermined on the map search application using a touch pen.

In operation 1620 of FIG. 16A, the portable terminal device 100 may respond to a detected gesture to overlap a handwriting input layer 1621 with the map search application.

In operation 1630 of FIG. 16B, the portable terminal device 100 may receive a handwriting image 1631 on the handwriting input layer 1621 using the touch pen. The portable terminal device 100 may recognize the handwriting image 1631 in consideration of an attribute of an area of the application corresponding to an area 1622 of the handwriting input layer 1621. In this case, an input box of the area of the application may be a text input box for inputting a text. In this case, the handwriting image 1631 input into the area 1622 of the handwriting input layer 1621 may be recognized as a text that may be input in the text input box.

In operation 1640 of FIG. 16B, the portable terminal device 100 may apply a recognized result of a handwriting image to an executed application. For example, if a search application is a web search application, the portable terminal device 100 may use the recognized text as a search word to search for an electronic document including the text as information related to a text recognized in a storage unit (not shown) of a server positioned outside the portable terminal device 100. The portable terminal device 100 may also display the searched electronic document on the touch screen.

As another example, if a search application is a map search application, the portable terminal device 100 may determine the recognized text as a position that is a search word that a user wants to search for, search the server positioned outside the portable terminal device 100 or the storage unit 150 of the portable terminal 100 for a new map image 1641 including the position, and display the new map image 1641 on the touch screen. A text 1642 that is a recognized result of the handwriting image may be inserted into and displayed in the search field 1612. A new handwriting input layer 1643 may be provided on the new map image 1641. The new handwriting input layer 1643 may be automatically provided when the new map image 1641 is displayed or may be provided in response to a gesture of the user predetermined on the new map image 1641.

The portable terminal device 100 may search for a text that matches with the text that is the recognized result of the handwriting image, among texts included in the currently displayed map image 1611 through the handwriting input layer 1621. The portable terminal device 100 may move the map image 1611 into a position of the searched text or may highlight and display the searched text to visually distinguish the searched text from other texts.

In operation 1650 of FIG. 16C, the portable terminal device 100 may re-receive the handwriting image 1651 on a new handwriting input layer 1643 using the touch pen. The portable terminal device 100 may recognize the handwriting image 1651 in consideration of an attribute of an area of the application corresponding to an area 1644 of the handwriting input layer. In this case, an input box of the area of the application may be an image input box for inputting an image. The handwriting image 1651 input into the area 1644 of the new handwriting input layer may be recognized as an image.

In operation 1660 of FIG. 16C, the portable terminal device 100 may overlap an image 1661 that is the recognized result, with the new map image 1641.

In operations 1610 of FIG. 16A through 1660 of FIG. 16C, the user may transmit a handwriting image input through a handwriting input layer or a recognized result of the handwriting image to another device or another user through share icons 1691, 1692, and 1693. For example, if one of the share icons 1691, 1692, and 1693 is selected by the user, the portable terminal device 100 may transmit a handwriting image input into a handwriting input image to another device or another user. If one of the share icons 1691, 1692, and 1693 is selected when a recognized result of the handwriting image is applied, the portable terminal device 100 may transmit the applied result (for example, a new map image) to another device or another user. Here, the share icons 1691, 1692, and 1693 may respectively include an icon 1691 for performing a transmission using a short message service (SMS), an icon 1692 for performing a transmission using an e-mail, and an icon 1693 for performing a transmission by using a social networking service (SNS) such as Facebook.

Figure 17A:
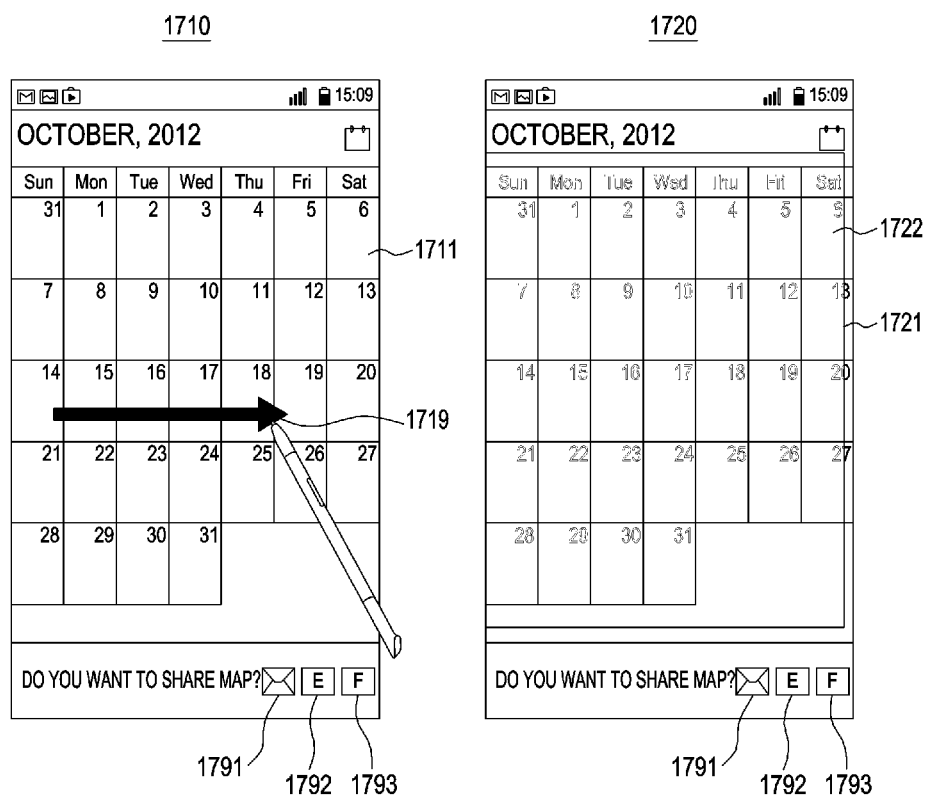

FIGS. 17A through 17C are views illustrating a scenario that applies a recognized result of a handwriting image to a schedule management application in the portable terminal device 100, according to an exemplary embodiment.

In operation 1710 of FIG. 17A, the portable terminal device 100 may execute a schedule management application. The schedule management application may have a table 1711 including a plurality of cells. The table 1711 including the plurality of cells may be a calendar in which dates are respectively displayed in the cells. The portable terminal device 100 may also detect a touch drag gesture 1719 predetermined on the schedule management application using a touch pen.

In operation 1720 of FIG. 17A, the portable terminal device 100 may respond to a detected gesture to overlap a handwriting input layer 1721 with the schedule management application.

In operation 1730 of FIG. 17B, the portable terminal device 100 may receive a handwriting image 1731 on the handwriting input layer 1721 using the touch pen. The portable terminal device 100 may recognize the handwriting image 1731 in consideration of an attribute of an area of the schedule management application corresponding to an area 1722 of the handwriting input layer 7121. In this case, an input box of the area of the schedule management application may be a cell selection input box for selecting a cell. In this case, the portable terminal device 100 may recognize the handwriting image 1731 input into the area 1722 of the handwriting input layer 1721 as a command that is to select at least one of the plurality of cells of the schedule management application. For example, the portable terminal device 100 may recognize the handwriting image 1731 as a command that is to select at least one cell of the schedule management application overlapping with the handwriting image 1731 input into the area 1722 of the handwriting input layer 1721.

In operation 1740 of FIG. 17B, the portable terminal device 100 may apply a recognized result of a handwriting image to the executed schedule management application. For example, if the portable terminal device 100 recognizes the command that selects at least one cell, the portable terminal device 100 may highlight and display at least one selected cell 1743 to visually distinguish the at least one selected cell 1743 from other cells.

For example, in operation 1730 of FIG. 17B, the portable terminal device 100 may receive the handwriting image 1731 that draws a horizontal line in the area 1722 of the handwriting input layer 1721. In operation 1740 of FIG. 17B, the portable terminal device 100 may visually distinguish cells of different days of the same week, which overlap with the horizontal line drawn, as a recognized result of the handwriting image 1731 from other cells in the executed schedule management application. As another example, in operation 2110 of FIG. 21A, the portable terminal device 100 may receive a handwriting image 2111 that draws a vertical line in the area 1722 of the handwriting input layer 1721. In operation 2130 of FIG. 21A, the portable terminal device 100 may visually distinguish cells 2131 of the same days of different weeks, which overlap with the vertical line, as a recognized result of the handwriting image 2111 from other cells in the executed schedule management application.

As another example, in operation 2150 of FIG. 21B, the portable terminal device 100 may receive a handwriting image 2151 that draws a check or a circle in an area 1722 of a handwriting input layer. In operation 2170 of FIG. 21B, the portable terminal device 100 may visually distinguish a cell 2171, which overlaps with the check or the circle, as a recognized result of the handwriting image 2151 from other cells in the executed schedule management application.

In operation 1740 of FIG. 17B, a new handwriting input layer 1741 may be provided on a table including a highlighted cell. The new handwriting input layer 1741 may be automatically provided when the table is displayed, or may be provided in response to a predetermined gesture of the user.

In operation 1750 of FIG. 17C, the portable terminal device 100 may receive a handwriting image 1751 on the new handwriting input layer 1741 using the touch pen. The portable terminal device 100 may recognize the handwriting image 1751 in consideration of an attribute of an area of an application corresponding to an area 1742 of the handwriting input layer 1741. In this case, an input box of the area of the application may be a text input box for inputting a text. A handwriting image input into the area 1742 of the new handwriting input layer 1741 may be recognized as a text.

In operation 1760 of FIG. 17C, the portable terminal device 100 may display a recognized text 1761 on at least one of cells 1743 that are highlighted. An arrow may be further displayed along with the recognized text 1761 to indicate a start and an end of the cells 1743. The text 1761 may be stored schedule-related data of a schedule management application to be re-displayed when the user re-executes the schedule management application.

In operations 1710 of FIG. 17A through 1760 of FIG. 17C, the user may control a schedule management application positioned under a handwriting input layer using a finger instead of the touch pen. For example, if the user performs a touch drag from top to bottom or from left to right using the finger in operations 1710 of FIG. 17A through 1760 of FIG. 17C, a table may provide a different month from a month displayed on a touch screen or a different year from a year displayed on the touch screen through the schedule management application.

In operations 1710 FIG. 17A through 1760 of FIG. 17C, the user may share a handwriting image input through a handwriting input layer or a recognized result of the handwriting image with another device or another user. For example, if share icons 1791, 1792, and 1793 are selected by the user, the portable terminal device 100 may transmit a month or a day unit schedule, which is a recognized result of a handwriting image input on a handwriting input layer, to another device or another user. Alternatively, if the share icons 1791, 1792, and 1793 are selected by the user, the portable terminal device 100 may transmit a handwriting image input on a handwriting input layer or the handwriting input layer, on which the handwriting image has been input, to another device or another user. In this case, the transmitted handwriting input layer or the transmitted handwriting image may overlap with a handwriting input layer displayed on a touch screen of the another device to be displayed on the touch screen of the another device. In this case, a user who has received the handwriting input layer or the handwriting image may adjust a schedule of the user with reference to a received schedule of another user.

In operations 1710 of FIG. 17A through 1760 of FIG. 17C, the user may delete a schedule displayed on a table including a plurality of cells, using a handwriting input layer. For example, if a cancelling line is input on the handwriting input layer by the user, the portable terminal device 100 may delete a schedule displayed under the cancelling line.

In operations 1710 of FIG. 17A through 1760 of FIG. 17C, the user may re-close the provided handwriting input layer. As a method of closing a handwriting input layer, the user may perform a touch drag from a center of a handwriting input layer to a side using a touch pen or pressing a backspace button of the portable terminal device 100. Alternatively, if there is no input of the user on a handwriting input layer for a predetermined time, the handwriting input layer may be automatically closed.

Figure 18A:
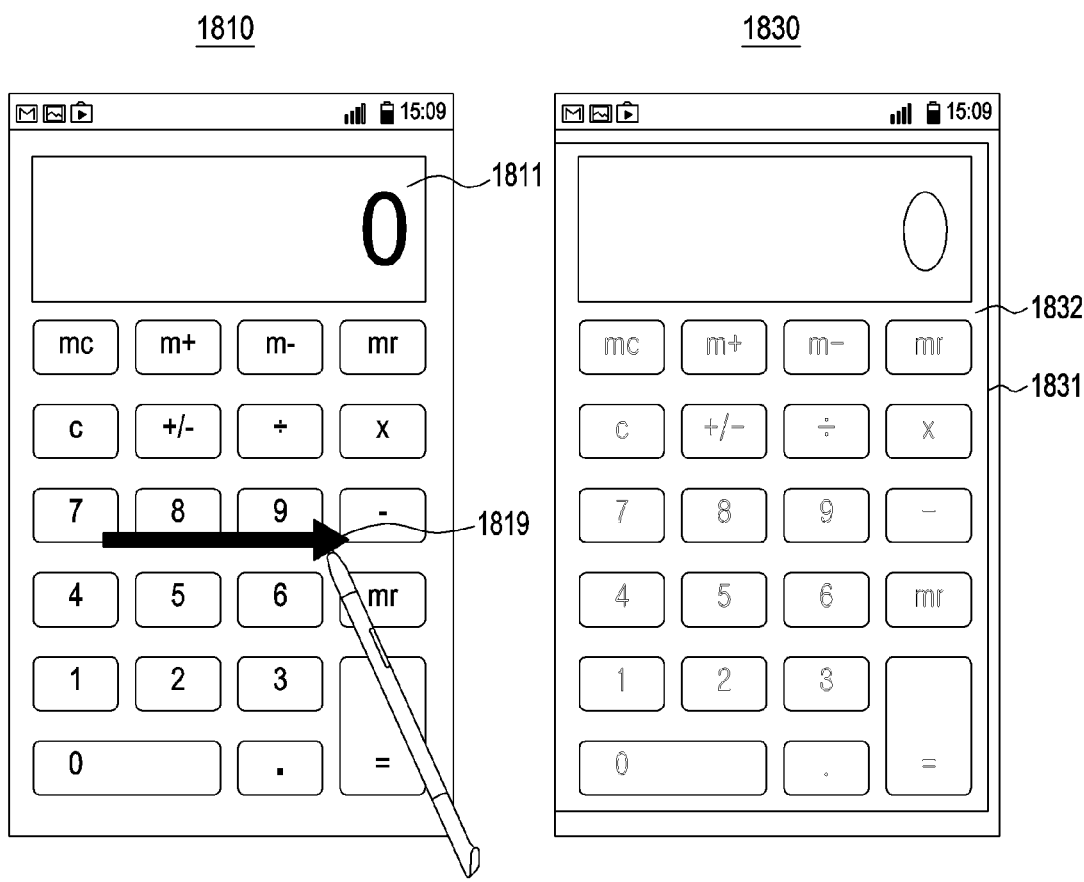

FIGS. 18A and 18B are views illustrating a scenario that applies a recognized result of a handwriting image in a calculator application in the portable terminal device 100, according to an exemplary embodiment.

In operation 1810 of FIG. 18A, the portable terminal device 100 may execute a calculator application. The calculator application may include an input field 1811 for inputting a number. The portable terminal device 100 may detect a touch drag gesture 1819 that is predetermined on the calculator application using a touch pen.

In operation 1830 of FIG. 18A, the portable terminal device 100 may respond to a detected gesture to overlap a handwriting input layer 1831 with the calculator application. The handwriting input layer 1831 may be displayed to be transparent, semi-transparent, or opaque.

In operation 1850 of FIG. 18B, the portable terminal device 100 may receive a handwriting image 1851 on the handwriting input layer 1831 using the touch pen. The portable terminal device 100 may recognize the handwriting image 1831 in consideration of an attribute of an area of the calculator application corresponding to an area 1832 of the handwriting input layer 1831 into which handwriting input images have been input. In this case, an input box of the area of the calculator application may be a number or symbol input box for inputting a number or a symbol. In this case, a handwriting input image input into the area 1832 of the handwriting input layer 1831 may be recognized as a number or a symbol. For example, if the user displays mark "??" on the handwriting input layer 1831 to request a recognition of the number or the symbol or there is no input of the user on the handwriting input layer 1831 for a predetermined time, a handwriting image input on the handwriting input layer 1831 may be recognized.

In operation 1870 of FIG. 18B, the portable terminal device 100 may apply a calculated value 1871 that is a recognized result of a handwriting image, to the executed calculator application. For example, a handwriting image input into the area 1832 of the handwriting input layer 1831 may be recognized a number or a symbol, and the calculated value 1871 of the recognized result may be inserted into the input field 1811 included on an execution screen of the calculator application to be displayed on the input field 1811. Alternatively, the recognized numbers or symbols may be inserted into the input field 1811 included on the execution screen of the calculator application to be displayed in the input field 1811.

FIG. 19 is a flowchart illustrating a handwriting input method of the portable terminal device 100, according to another exemplary embodiment.

Referring to FIG. 19, in operation S1901, the portable terminal device 100 executes a particular application according to a request of a user or when driving a power source, and displays an execution screen of the executed particular application on the touch screen 140.

In operation S1903, the portable terminal device 100 overlaps a handwriting input layer for a handwriting input with the execution screen of the executed calculator application to provide the handwriting input layer overlapping with the execution screen. The portable terminal device 140 may respond to a gesture predetermined on the touch screen 140 to provide the handwriting input layer for the handwriting input.

In operation S1905, the portable terminal 100 receives a handwriting image on the handwriting input layer using a touch pen.

In operation 1907, the portable terminal device 100 recognizes the handwriting image as a different data type from a data type of a handwriting image that is input and recognized on a different handwriting input layer from the handwriting input layer before providing the handwriting input layer. For example, if a handwriting image input on a first handwriting input layer is recognized as a text, the portable terminal device 100 may recognize a handwriting image input on a second handwriting input layer as an image when the recognized result is applied to the executed application. Also, the portable terminal device 100 may recognize handwriting images, which are respectively input on handwriting input layers, as different data types according to provided orders of the handwriting input layers.

In operation S1909, the controller 160 of the portable terminal device 100 applies the recognized result to the executed application.

FIG. 20 is a flowchart illustrating a handwriting input method of the portable terminal device 100, according to another exemplary embodiment.

Referring to FIG. 20, in operation S2001, the portable terminal device 100 executes a particular application according to a request of a user or when driving a power source and displays the executed particular application on the touch screen 140.

In operation S2003, the portable terminal device 100 overlaps a handwriting input layer for a handwriting input with the executed particular application. The portable terminal device 100 may respond to a gesture predetermined on the touch screen 140 to provide the handwriting input layer for the handwriting input.

In operation S2005, the portable terminal device 100 receives handwriting input images in a first area and a second area of the handwriting input layer using a touch pen. The first area and the second area may be different areas.

In operation S2007, the portable terminal device 100 recognizes the handwriting image input in the first area of the handwriting input layer as a text type and the handwriting image input in the second area of the handwriting input layer as an image type in consideration of attributes of the first area and the second area of the executed particular application respectively corresponding to the first area and the second area of the handwriting input layer.

In operation S2009, the controller 160 of the portable terminal device 100 applies the recognized result to the executed particular application.

According to various exemplary embodiments, data may be quickly input into an application that is executed in a portable terminal device, using a touch pen. In particular, a handwriting image may be input on an input field of the application using the touch pen to quickly provide an intuitive interface to a user.

Effects that may be acquired or expected according to the exemplary embodiments have been directly or suggestively disclosed in the detailed description of the exemplary embodiments. In other words, various effects that may be expected according to the exemplary embodiments have been disclosed in the detailed description that has been described above.

The above-described exemplary embodiments may be embodied as software or a combination of hardware and software. Such arbitrary software may be optically or magnetically on a volatile or non-volatile storage device such as a read only memory (ROM) etc., a memory such as a random access memory (RAM), a memory chip, a device, or an integrated circuit (IC), a CD, a DVD, a magnetic disc, or a magnetic tape and may stored on a machine-readable (for example, a computer-readable) storage medium.

A portable terminal device using a touch pen and a handwriting input method thereof according to the exemplary embodiments may be realized by a computer, at least one processor, or a portable terminal device including a controller and a memory. The memory may be an example of a program that includes commands to realize exemplary embodiments or a machine-readable storage medium that is appropriate to store programs. Therefore, the exemplary embodiments may include a program that includes a code for realizing an apparatus and a method described in an arbitrary claim of the present specification and a machine-readable (for example, computer-readable) storage medium that stores the program. The program may be electronically transmitted through an arbitrary medium such as a communication signal that is transmitted through a wire or wireless connection, and the exemplary embodiments may appropriately include equivalents.

The portable terminal device using the touch pen and the handwriting input method thereof may receive and store the program from a program providing apparatus that is connected through a wire or wirelessly. Also, a user may adjust settings of the portable terminal device of the user to limit operations of the exemplary embodiments into the portable terminal device of the user, or may operate along with a server through a network to selectively extend.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A handwriting input method of an electronic device using a touch pen, the handwriting input method comprising:

displaying an execution screen of an application on a touch screen in response to the application being executed;

overlapping a handwriting input layer, which is configured for a handwriting input, with the execution screen;

in response to a handwriting image being input on the handwriting input layer by the touch pen, determining a data type for recognizing the handwriting image based on an area in which the handwriting image is input among a plurality of areas of the handwriting input layer, and recognizing the handwriting image as the determined data type; and applying the recognized handwriting image to the application differently according to the determined data type of the handwriting image, wherein, the determining comprises:

determining the data type for recognizing the handwriting image as a text in response to the handwriting image being input in a first area among the plurality of areas of the handwriting input layer, and determining the data type for recognizing the handwriting image as an image in response to the handwriting image being input in a second area different from the first area among the plurality of areas of the handwriting input layer.

2. The handwriting input method of claim 1, wherein the determining the data type for recognizing the handwriting image further comprises:

determining the data type for recognizing the handwriting image based on an area of the execution screen overlapping with the area of the handwriting input layer, in which the handwriting image has been input, under the handwriting input layer, and recognizing the handwriting image as the determined data type.

3. The handwriting input method of claim 1, wherein the application is an application that displays a web screen provided by a server which is positioned outside the electronic device, and wherein the determining the data type for recognizing the handwriting image further comprises:

determining the data type input in a component of a hypertext markup language (HTML) document in an area of the web screen as the data type for recognizing the handwriting image, and recognizing the handwriting image as the determined data type.

4. The handwriting input method of claim 1, wherein in response to the execution screen comprising a text input field, the determining the data type for recognizing the handwriting image comprises:

recognizing the handwriting image as the text which is input in the text input field, and the applying the recognized result of the determined data type to the application comprises:

displaying the recognized text in the text input field.

5. The handwriting input method of claim 1, wherein in response to the area of the handwriting input layer in which the handwriting image has been input corresponding to a number input field in the execution screen, the determining the data type for recognizing the handwriting image further comprises:

recognizing the handwriting image as at least one of a number or a numerical formula, and the applying the recognized result of the determined data type to the application comprises:

displaying a result calculated according to the recognized at least one number or the numerical formula in the number input field.

6. The handwriting input method of claim 1, wherein:

the determining the data type for recognizing of the handwriting image further comprises:

recognizing the handwriting image as the text; and the applying the recognized result of the determined data type to the application comprises:

using the recognized text as a search word to display at least one of an electronic document and a map image which comprises the search word.

7. The handwriting input method of claim 1, wherein in response to the area of the handwriting input layer in which the handwriting image has been input corresponding to a table comprising a plurality of cells in the execution screen, the determining the data type for recognizing the handwriting image further comprises:

recognizing the handwriting image as a command which selects at least one of the plurality of cells, and the applying the recognized result of the determined data type to the application comprises:

in response to a handwriting image being additionally input on the handwriting input layer using the touch pen, recognizing the additionally input handwriting image as the text or the image to display the text or the image on at least one selected cell.

8. The handwriting input method of claim 1, wherein the determining the data type for recognizing the handwriting image further comprises:

recognizing the handwriting image as a plurality of respective data types; and storing a plurality of results recognized as the plurality of respective data types.

9. An electronic terminal device using a touch pen, the electronic terminal device comprising:

a touch screen device configured to display an execution screen of an application in response to the application being executed; and a processor configured to:

in response to a handwriting image being input on an area of a handwriting input layer by the touch pen, determine a data type to recognize the handwriting image based on an area in which the handwriting image is input among a plurality of areas of the handwriting input layer;

recognize the handwriting image as the determined data type; and apply the recognized handwriting image to the executed application differently according to the determined data type of the handwriting image, wherein the handwriting input layer overlaps with the execution screen of the application, and the processor is further configured to:

determine the data type for recognizing the handwriting image as a text in response to the handwriting image being input in a first area among the plurality of areas of the handwriting input layer, and determine the data type for recognizing the handwriting image as an image in response to the handwriting image being input in a second area different from the first area among the plurality of areas of the handwriting input layer.

10. The electronic terminal device of claim 9, wherein the processor is further configured to determine the data type to recognize the handwriting image based on an area of the execution screen overlapping with the area of the handwriting input layer under the handwriting input layer, and recognize the handwriting image as the determined data type.

11. The electronic terminal device of claim 9, wherein the application is an application that displays a web screen provided by a server which is positioned outside the electronic terminal device, wherein the processor is further configured to determine the data type input in a component of a hypertext markup language (HTML) document in an area of the web screen as the data type to recognize the input-handwriting image, and recognize the handwriting image as the determined data type.

12. The electronic terminal device of claim 9, wherein in response to the area of the execution screen comprising a text input field, the processor is further configured to recognize the handwriting image as the text which is input in the text input field and display the recognized text in the text input field.

13. The electronic terminal device of claim 9, wherein in response to the area of the execution screen comprising a number input field, the processor is further configured to recognize the handwriting image as at least one of a number or a numerical formula and display a result calculated according to the recognized at least one number or the numerical formula in the number input field.

14. The electronic terminal device of claim 9, wherein the processor is further configured to recognize the handwriting image as the text and use the recognized text as a search word to display at least one of an electronic document and a map image which comprises the search word.

15. The electronic terminal device of claim 9, wherein in response to the area of the execution screen comprising a table comprising a plurality of cells, the processor is further configured to recognize the handwriting image as a command which selects at least one of the plurality of cells and, in response to a handwriting image being additionally input on the handwriting input layer using the touch pen, the processor is further configured to recognize the additionally input handwriting image as the text or the image to display the text or the image on at least one selected cell.

16. The electronic terminal device of claim 9, wherein the processor is further configured to recognize the handwriting image as a plurality of respective data types and store a plurality of results recognized as the plurality of respective data types.

17. A handwriting input method of an electronic terminal device, the method comprising:
- displaying an application on a touch screen in response to the application being executed;
- displaying an input field provided by the application;
- determining whether a touch input has been performed using a finger or a touch pen;
- providing a handwriting input layer for receiving a handwriting image it is determined that the touch input has been performed using the touch pen;
- determining a data type for recognizing the handwriting image as a text in response to the handwriting image being input in a first area among a plurality of areas of the handwriting input layer,
- determining the data type for recognizing the handwriting image as an image in response to the handwriting image being input in a second area different from the first area among the plurality of areas of the handwriting input layer;
- displaying the handwriting image in the input field according to the determined data type of the handwriting image.

18. The handwriting input method of claim 17, further comprising:
- in response to determining that the touch input has been performed by the finger, displaying a keypad and receiving a text input via the keypad.

19. The handwriting input method of claim 17, wherein the providing the handwriting input layer comprises:
- overlapping the handwriting input layer on the input field;
- converting the handwriting image into a text input when the data type for recognizing the handwriting image is determined as the text; and
- acquiring the text based on the converted text input.

* * * * *